United States Patent
Höglund

(10) Patent No.: US 11,628,542 B2
(45) Date of Patent: Apr. 18, 2023

(54) METHOD AND APPARATUS FOR PRODUCING ENDLESS ABRASIVE ARTICLES AND A PRODUCED ABRASIVE ARTICLE

(71) Applicant: Mirka Ltd, Jepua (FI)

(72) Inventor: Göran Höglund, Nykarleby (FI)

(73) Assignee: MIRKA LTD, Jepua (FI)

( * ) Notice: Subject to any disclaimer, the term of this patent is extended or adjusted under 35 U.S.C. 154(b) by 977 days.

(21) Appl. No.: 16/340,734

(22) PCT Filed: Oct. 10, 2017

(86) PCT No.: PCT/FI2017/050710
§ 371 (c)(1),
(2) Date: Apr. 10, 2019

(87) PCT Pub. No.: WO2018/069574
PCT Pub. Date: Apr. 19, 2018

(65) Prior Publication Data
US 2019/0314955 A1    Oct. 17, 2019

(30) Foreign Application Priority Data
Oct. 11, 2016 (FI) .................................. 20165766

(51) Int. Cl.
*B24D 11/00* (2006.01)
*B29C 53/74* (2006.01)
(Continued)

(52) U.S. Cl.
CPC ............ *B24D 11/001* (2013.01); *B29C 53/74* (2013.01); *C09K 3/1436* (2013.01); *B29L 2029/00* (2013.01)

(58) Field of Classification Search
CPC .............................. B24D 11/001; B29C 53/74
See application file for complete search history.

(56) References Cited

U.S. PATENT DOCUMENTS 3,005,295 A    10/1961    Tucker
3,906,684 A *   9/1975    Marshall ................. B29C 70/58
                                                                                           51/296

(Continued)

FOREIGN PATENT DOCUMENTS

CA         1023563        1/1987
JP         S5060366 U     6/1975

OTHER PUBLICATIONS

International Search Report for International Application No. PCT/FI2017/050710; International Filing Date Oct. 10, 2017; dated Jan. 17, 2018; 5 pages.

(Continued)

*Primary Examiner* — Pegah Parvini
(74) *Attorney, Agent, or Firm* — Cantor Colburn LLP

(57) ABSTRACT

A method for producing endless abrasive articles (100) comprises: —providing a mandrel coil (200), which comprises a first complete turn ($BO_A$) formed of an endless mandrel belt (BO), —feeding the endless mandrel belt (BO) to an input end (INO) of the mandrel coil (200) and unwinding the mandrel belt (B0) from an output end (OUT0) of the mandrel coil (200) so as to move the surface of the first complete turn ($BO_A$) of the mandrel coil (200), —forming a laminated sleeve (SLEEVE1) by feeding a first strip (S1) on the moving surface of the first complete turn ($BO_A$) of the mandrel coil (200), and—forming an endless abrasive article (100) by cutting the laminated sleeve (SLEEVE1).

12 Claims, 25 Drawing Sheets

(51) Int. Cl.
    *C09K 3/14*     (2006.01)
    *B29L 29/00*     (2006.01)

(56) References Cited

U.S. PATENT DOCUMENTS

| | | |
|---|---|---|
| 4,143,774 A | 3/1979 | Poulson |
| 5,681,612 A | 10/1997 | Benedict et al. |
| 6,406,576 B1 | 6/2002 | Benedict et al. |
| 2005/0032468 A1 | 2/2005 | Hunt et al. |

OTHER PUBLICATIONS

Written Opinion of the International Searching Authority for International Application No. PCT/FI2017/050710; International Filing Date: Oct. 10, 2017; dated Jan. 17, 2018; 9 pages.

\* cited by examiner

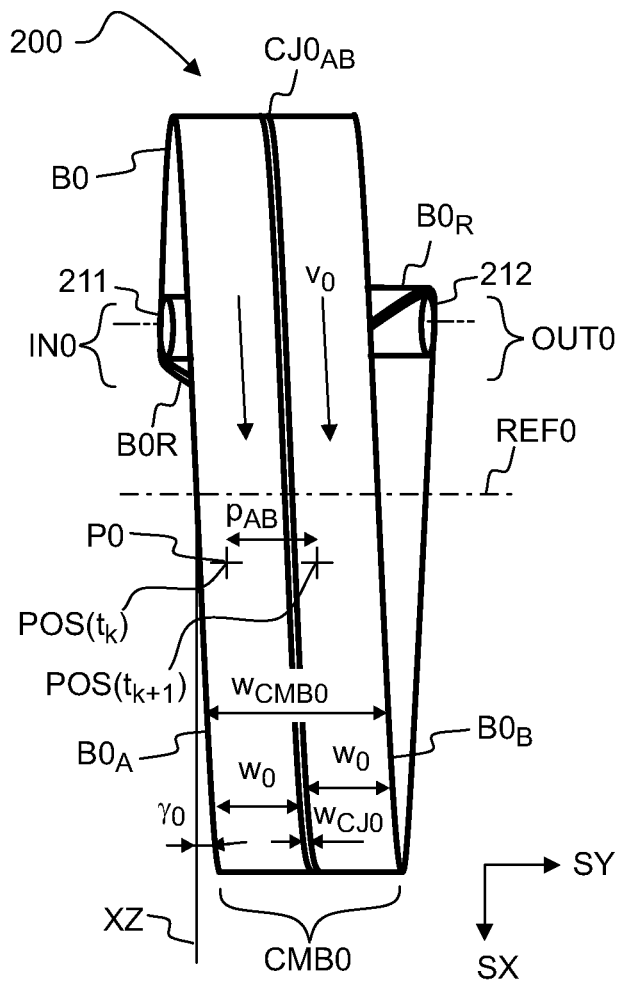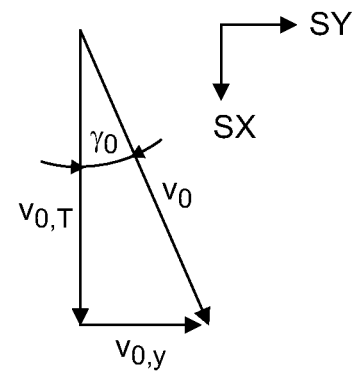
Fig. 3a
Fig. 3b

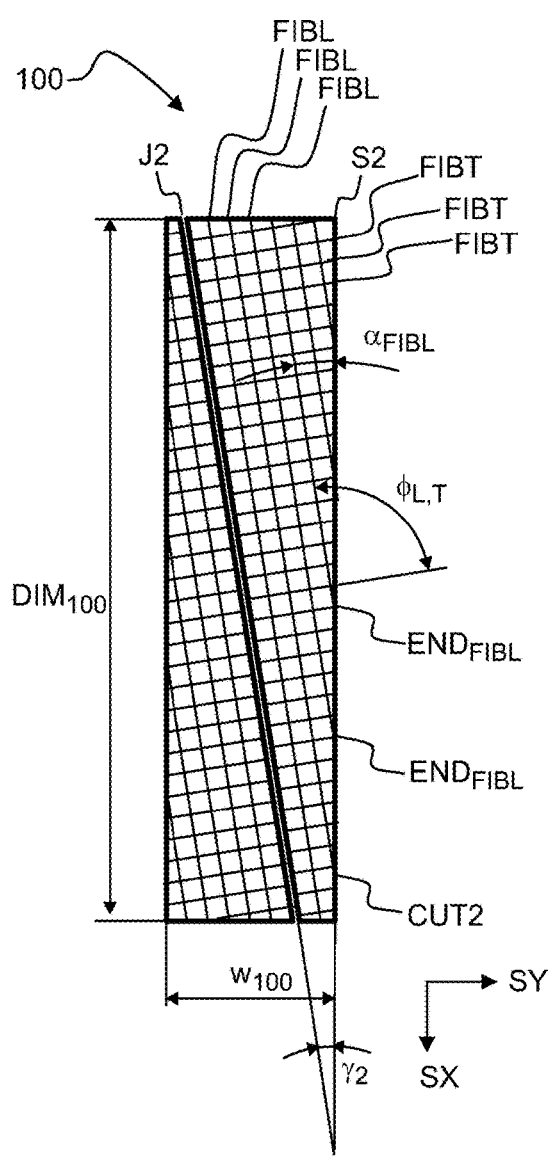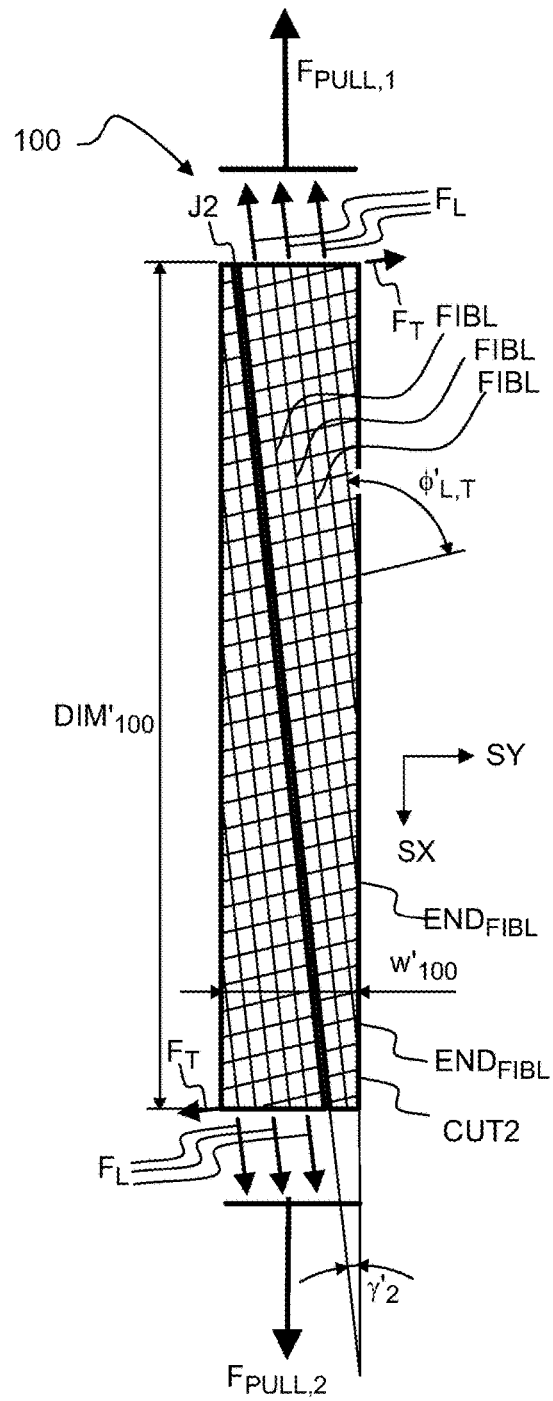
Fig. 13a
Fig. 13b

METHOD AND APPARATUS FOR PRODUCING ENDLESS ABRASIVE ARTICLES AND A PRODUCED ABRASIVE ARTICLE

CROSS REFERENCE TO RELATED APPLICATIONS

This application is a National Stage application of PCT/FI2017/050710, filed Oct. 10, 2017, which claims the benefit of Finnish Patent Application No. 20165766, filed Oct. 11, 2016, both of which are incorporated by reference in their entirety herein.

FIELD

Some versions relate to a method for producing endless abrasive articles. Some versions relate to an apparatus for producing endless abrasive articles. Some versions relate to an endless abrasive article. Some versions relate to grinding by using an endless abrasive article.

BACKGROUND

It is known that an endless abrasive belt may be formed by cutting a piece from an abrasive cloth strip, and joining the two ends of said piece with an adhesive. The endless abrasive belt may subsequently be used e.g. for grinding the surface of an object. However, the surface structure of the abrasive belt is spatially non-uniform due to the joint, and the joint may cause visible defects on the surface of the object.

SUMMARY

Some versions may relate to a method for producing endless abrasive articles. Some versions may relate to an apparatus for producing endless abrasive articles. Some versions may relate to an endless abrasive article. Some versions may relate to grinding by using an endless abrasive article.

According to an aspect, there is provided a method for producing endless abrasive articles (100), the method comprising:

providing a mandrel coil (200), wherein an endless mandrel belt (B0) forms at least a first complete turn ($B0_A$) of the mandrel coil (200), feeding the endless mandrel belt (B0) to an input end (IN0) of the mandrel coil (200) so as to move the surface of the first turn ($B0_A$) of the mandrel coil (200), forming a laminated sleeve (SLEEVE1) by feeding a first strip (S1) on the moving surface of the first complete turn ($B0_A$) of the mandrel coil (200), unwinding the mandrel belt (B0) from an output end (OUT0) of the mandrel coil (200), and forming an endless abrasive article (100) by cutting the laminated sleeve (SLEEVE1).

Further aspects are defined in the claims.

The laminated sleeve SLEEVE1 may be formed e.g. from two or more strips S1, S2 by using the mandrel coil 200 (the sleeve is shown e.g. in FIG. 2b). The mandrel coil 200 may comprise a supporting portion CMB0, which has a moving surface, and which may support the strips S1, S2 during the lamination. A first strip S1 may be fed to the mandrel coil 200, and a second strip S2 may be laminated on the first strip S1 so as to form the laminated sleeve SLEEVE1. The strips S1, S2 may be joined together by using an adhesive ADH1, and the supporting portion CMB0 may support the strips S1, S2 during initial curing of the adhesive ADH1.

The surface of the supporting portion CMB0 may be arranged to move substantially continuously in a precisely controlled manner. The surface of the supporting portion CMB0 may continuously rotate around the axis of the mandrel coil 200, and the surface of the supporting portion CMB0 may be simultaneously displaced in the axial direction. The surface of the supporting portion CMB0 may have an axial velocity component in addition to the tangential velocity component. The mandrel coil does not need to rotate or move with respect to the stationary frame, but the surfaces of the turns of the mandrel coil may move with respect to the stationary frame. The surface of the mandrel coil may have an axial velocity component when the mandrel coil does not move in the axial direction. The laminated sleeve does not need to slip with respect to the moving surface of the mandrel coil. In particular, the laminated sleeve does not need to slip in the axial direction with respect to the surface of the mandrel coil. The moving surface of the supporting portion CMB0 may pull the strips S1, S2 and may wind the strips S1, S2 on the mandrel coil 200 so as to form the laminated sleeve SLEEVE1.

Thanks to the continuous and stable axial movement, the strips S1, S2 may be precisely aligned with respect to the sleeve SLEEVE1. This may allow controlling the width of seams of the sleeve. This may allow controlling the orientation angle of the laminated sleeves. The mandrel coil 200 may define the inner circumference of the sleeve SLEEVE1.

The mandrel coil 200 may be formed of one or more endless mandrel belts B0. The mandrel coil 200 may comprise at least one complete turn (i.e. loop). At least a first complete turn of the coil 200 may be formed from a section of an endless mandrel belt B0. Moving the belt B0 may simultaneously cause moving the surface of the mandrel coil 200.

An endless abrasive article may be formed by cutting the laminated sleeve.

The width and the orientation of the seam of the endless abrasive article may be precisely controlled so that the endless abrasive article may provide a spatially uniform surface, when used for grinding the surface of an object.

The circumference of the inner surface of the article may be substantially constant at different axial positions (i.e. transverse positions). This may facilitate use of the article e.g. as an endless sanding belt. This may allow minimizing tracking problems when using the abrasive belt in a belt sander.

The term grinding may refer e.g. to sanding, polishing, honing, lapping and/or super finishing.

BRIEF DESCRIPTION OF THE DRAWINGS

In the following examples, several versions will be described in more detail with reference to the appended drawings, in which FIG. 3a shows, by way of example, in a side view, the mandrel coil, FIG. 3b shows, by way of example, tangential and axial velocity components of the supporting surface, FIG. 13a shows, by way of example, in a top view, an endless abrasive article, and FIG. 13b shows, by way of example, deformation of the article when the article is tensioned by a force.

DETAILED DESCRIPTION

Figure 1A:
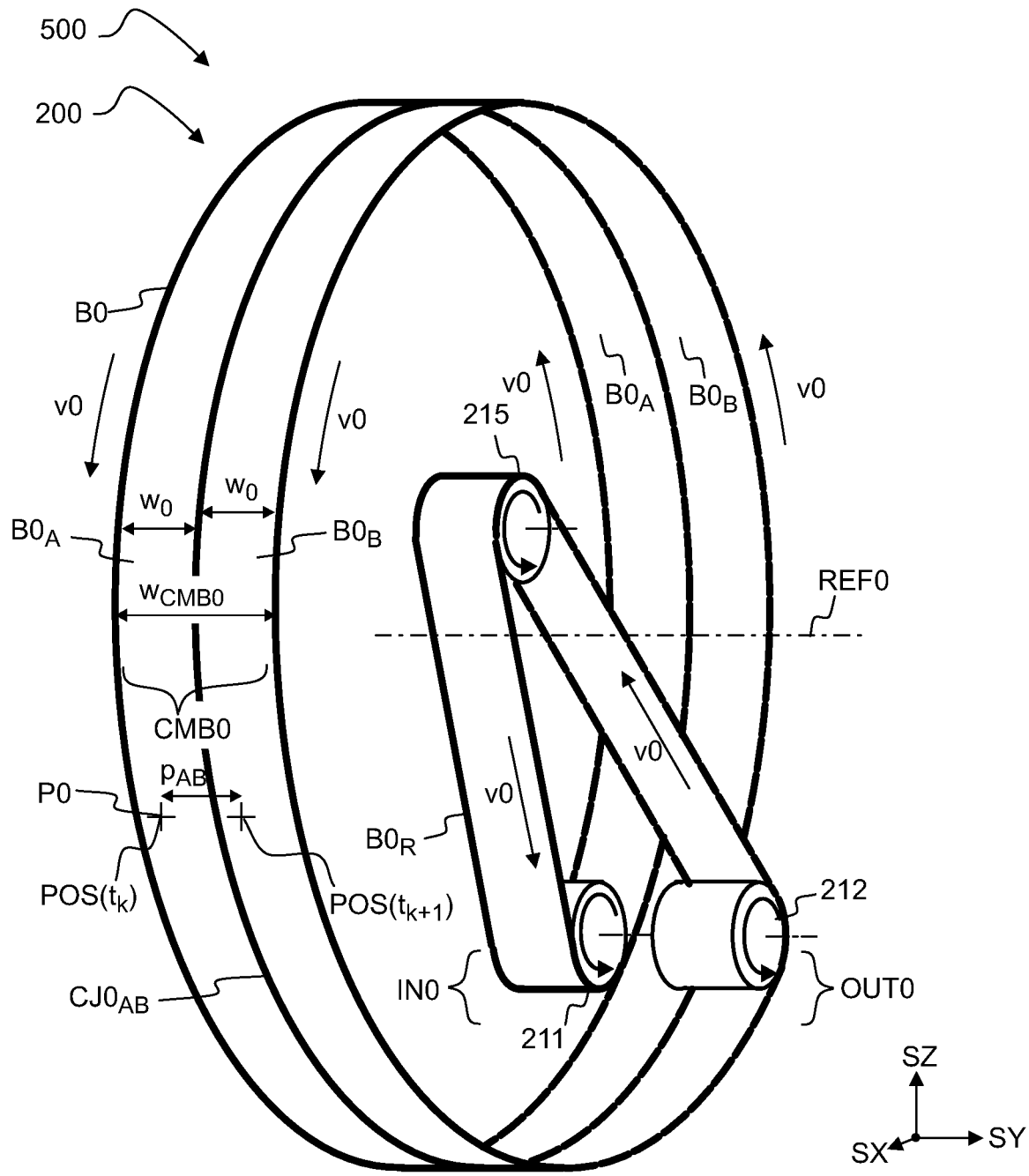
FIG. 1a shows, by way of example, in a three dimensional view, a mandrel coil.
Figure 2A:
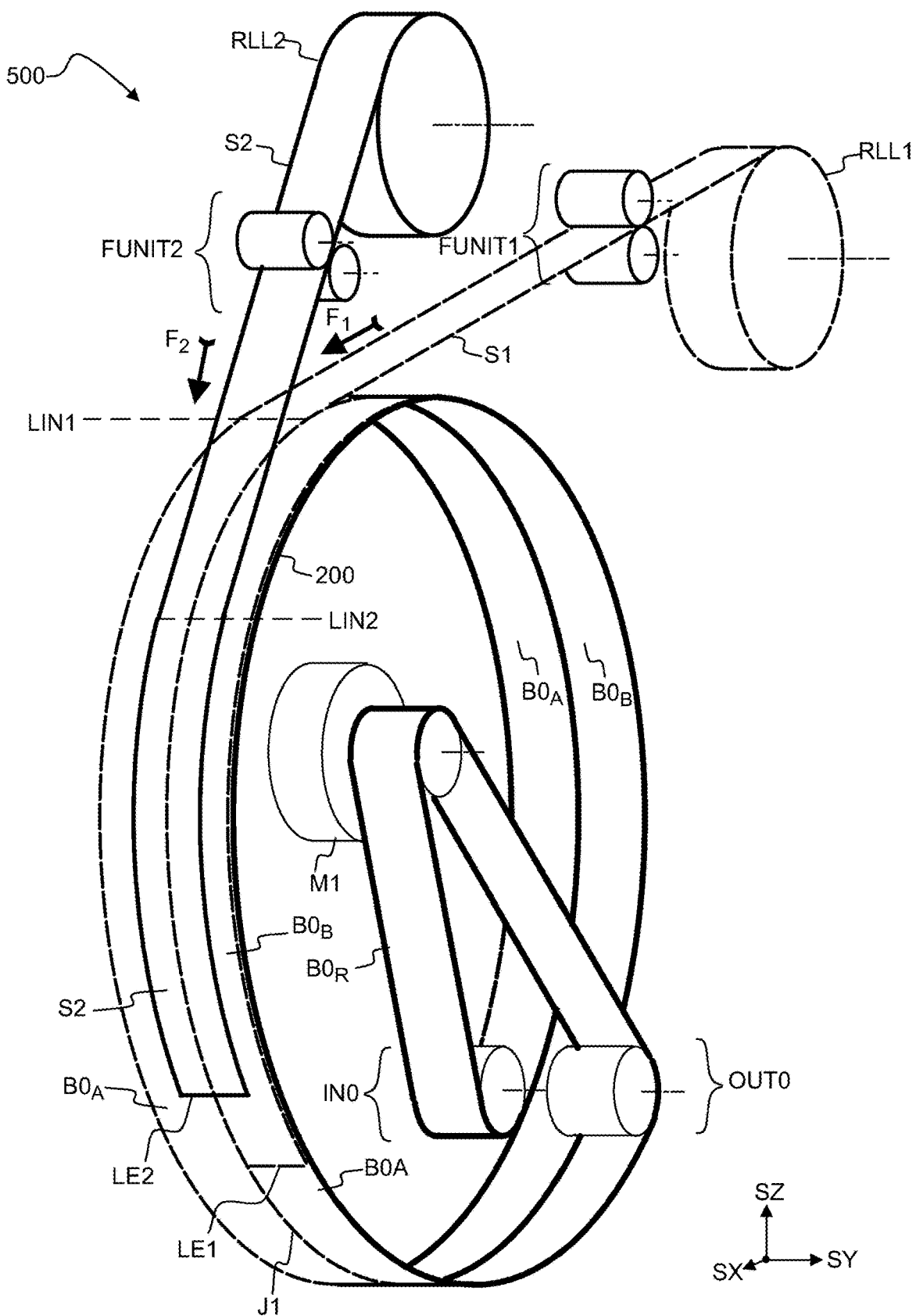
FIG. 2a shows, by way of example, in a three dimensional view, forming a sleeve by feeding a bottom strip and a second strip on the mandrel coil.
Figure 2B:
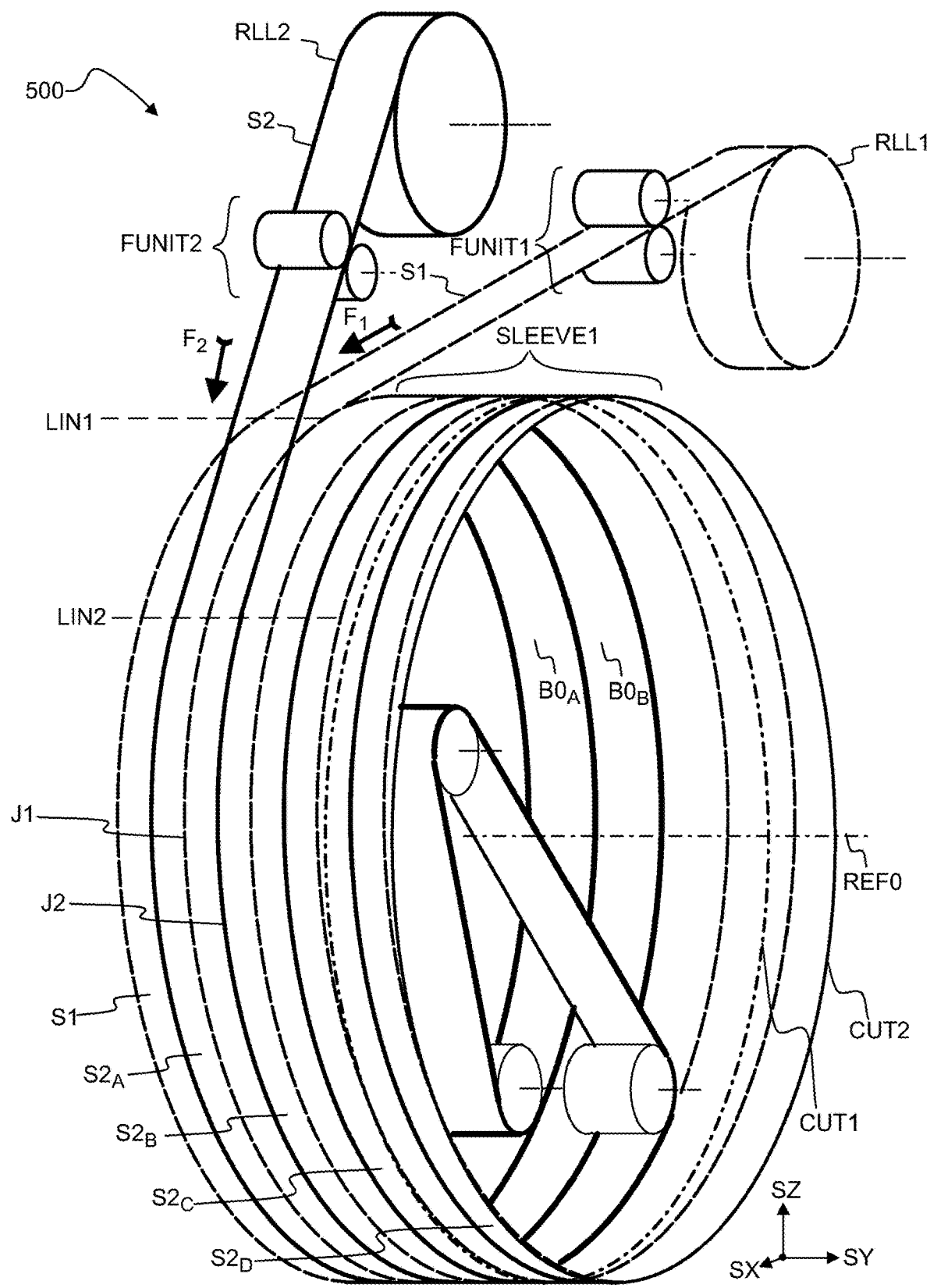
FIG. 2b shows, by way of example, in a three dimensional view, a sleeve formed on the mandrel coil.
Figure 5:
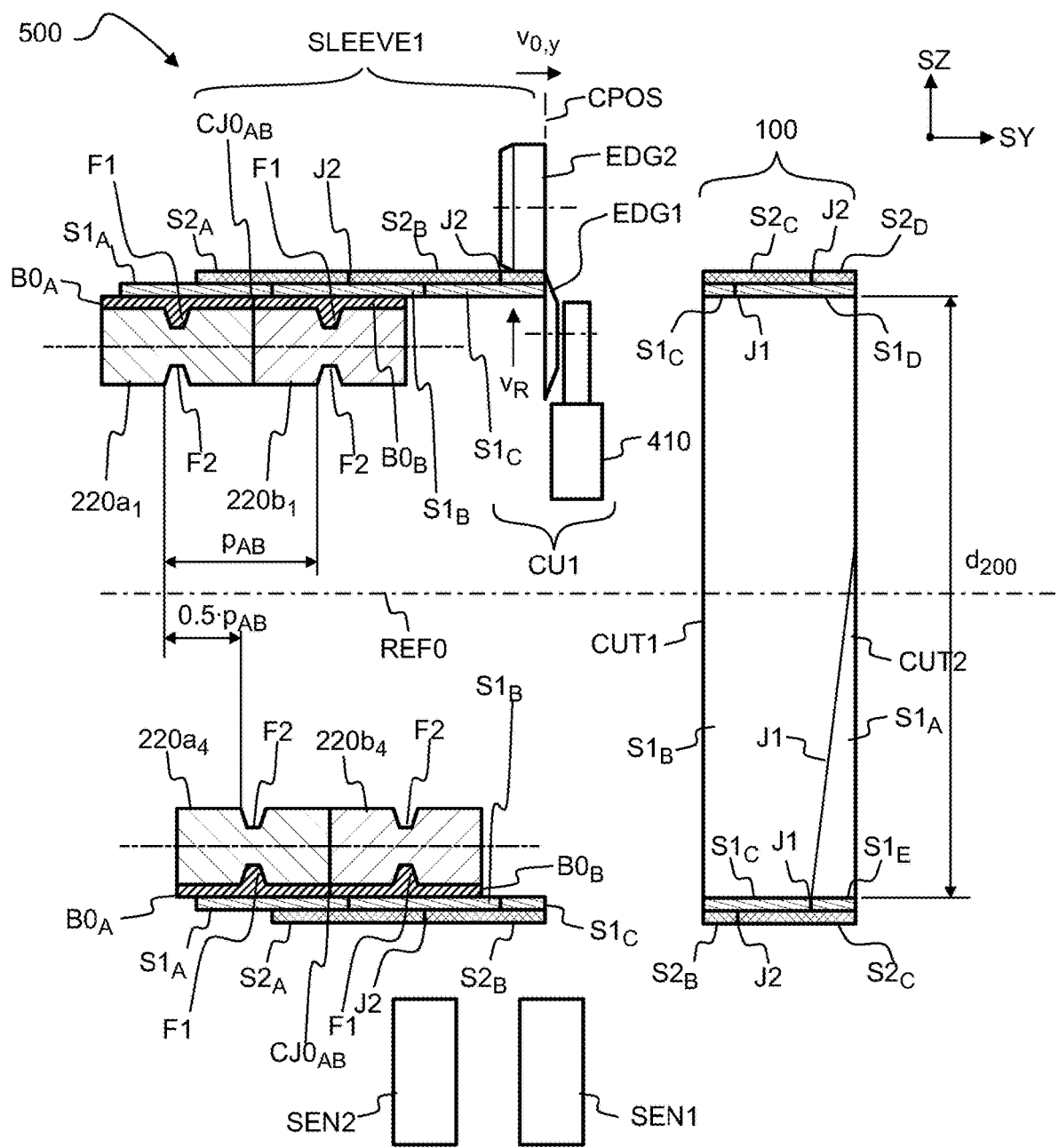
FIG. 5 shows, by way of example, in a side view, forming a sleeve on the mandrel coil, and forming an abrasive article by cutting the sleeve.

Referring to FIG. 1a, a production apparatus 500 may comprise a mandrel coil 200 for forming a laminated sleeve SLEEVE1 (the sleeve is shown e.g. in FIG. 2b and in FIG. 5). The mandrel coil 200 may be arranged to define an inner circumference $L_{CIR0}$ of the laminated sleeve SLEEVE1. The mandrel coil 200 may also be arranged to continuously move the laminated sleeve SLEEVE1 in a controlled manner. The mandrel coil 200 may provide a supporting surface CMB0, which may continuously rotate about an axis REF0, and which may also have an axial velocity component $v_{0,y}$ in the direction of the axis REF0. The supporting surface CMB0 may comprise one or more turns $B0_A$, $B0_B$ of the mandrel coil 200. The turns $B0_A$, $B0_B$ may have three-dimensional helical shape.

The laminated sleeve SLEEVE1 may be formed by e.g. laminating two or more strips S1, S2 together. The mandrel coil 200 may have a (combined) supporting surface CMB0, which may support the strip S1 during the lamination. The combined supporting surface CMB0 may be in contact with the lowermost strip S1 during the lamination. The supporting surface CMB0 may simultaneously support a first portion $S_{1A}$ and a second adjacent portion $S_{1B}$ of the strip S1, when a second strip S2 is laminated over the portions $S_{1A}$, $S_{1B}$.

Figure 12A:
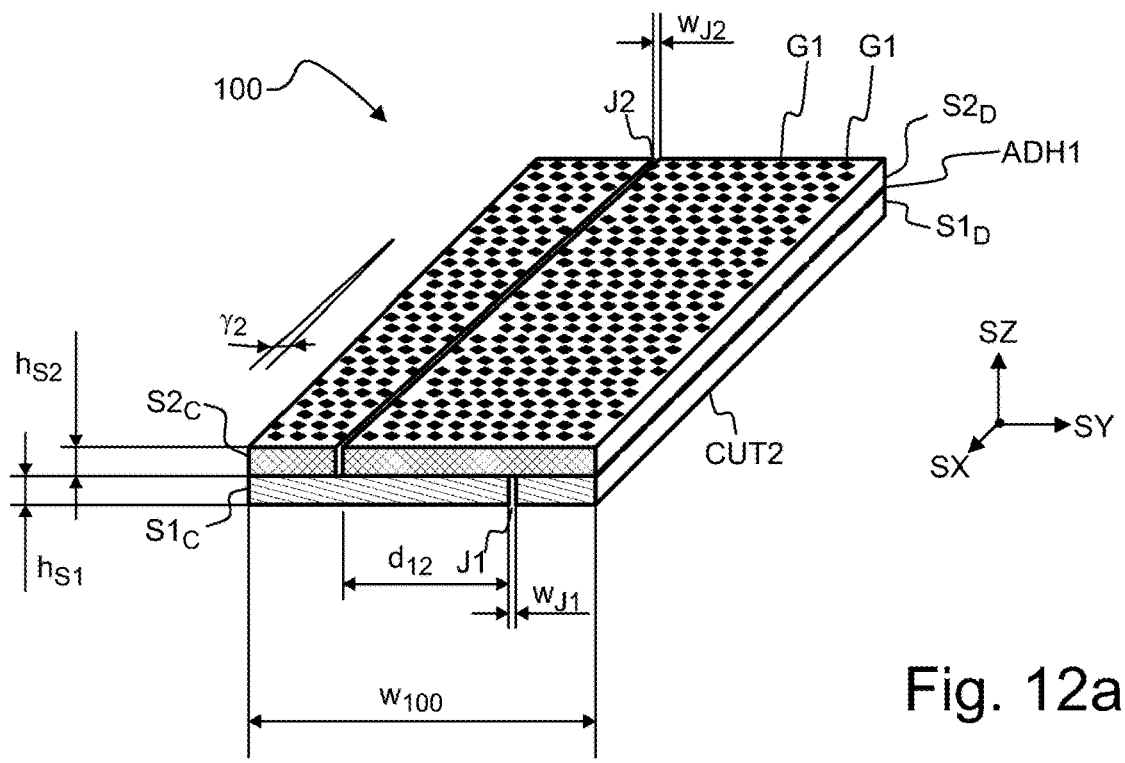
FIG. 12a shows, by way of example, in a three dimensional view, structural layers of an endless abrasive article.
Figure 12B:
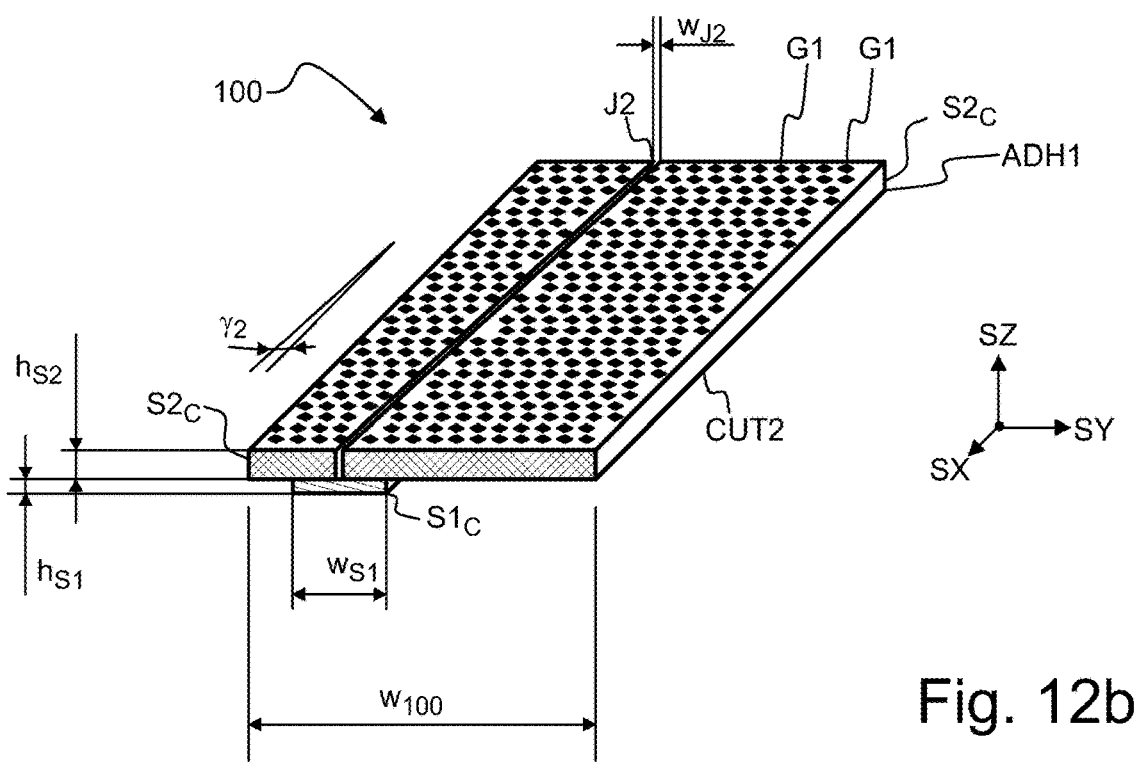
FIG. 12b shows, by way of example, in a three dimensional view, structural layers of a an endless abrasive article.
Figure 12C:
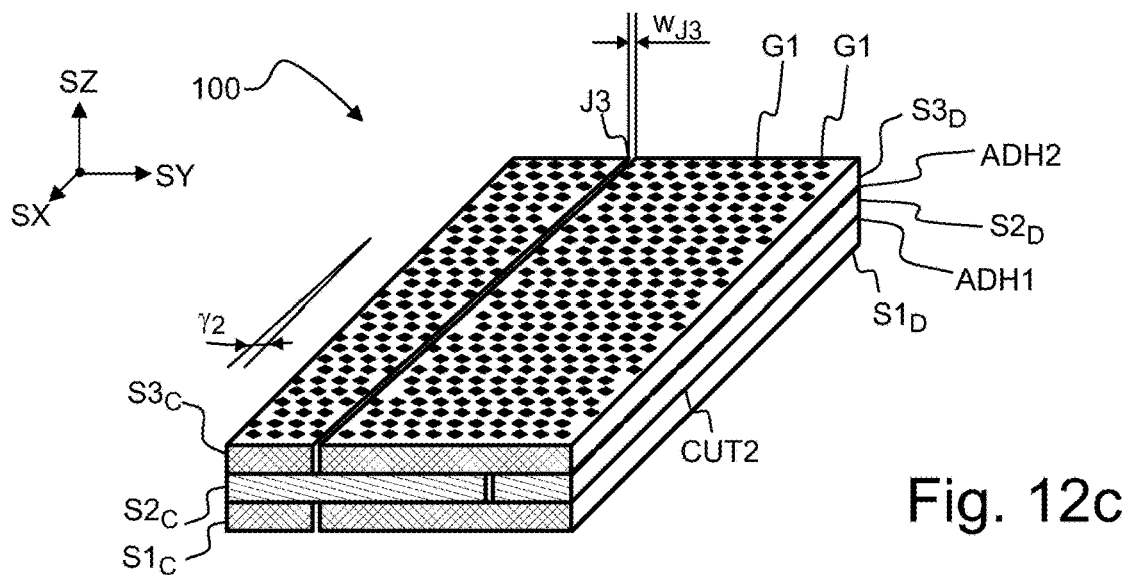
FIG. 12c shows, by way of example, in a three dimensional view, structural layers of an endless abrasive article.
Figure 12D:
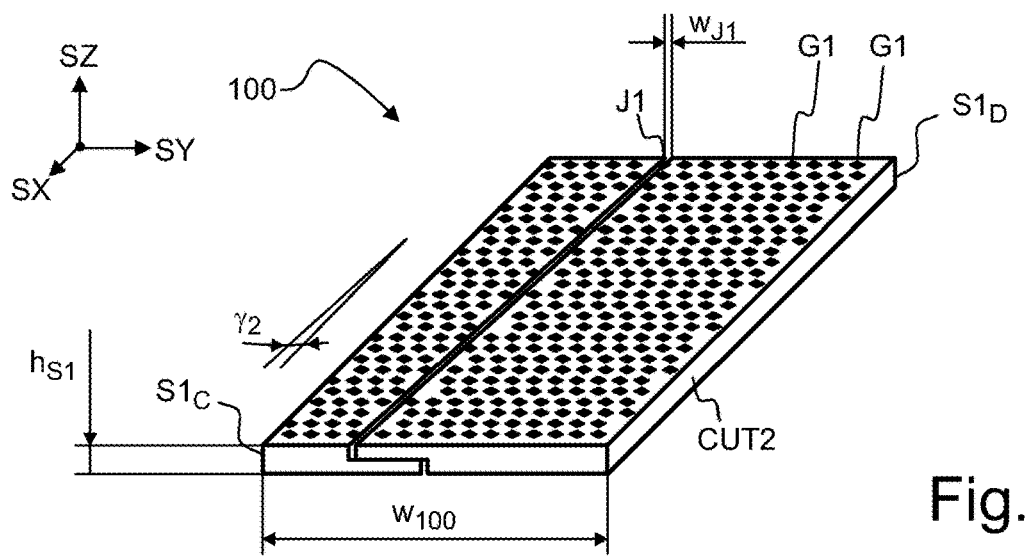
FIG. 12d shows, by way of example, in a three dimensional view, structural layers of an endless abrasive article formed of one strip.

The laminated sleeve SLEEVE1 may also be formed from only one strip S1 (see FIG. 12d). The strip S1 may be fed to the surface CMB0 of the mandrel coil 200 such that that the first edge of the strip S1 overlaps the second edge of the strip S1. The overlapping parts may be joined by using an adhesive ADH1. The laminated sleeve SLEEVE1 may also be formed e.g. by laminating three or more strips S1, S2, S3 together (see FIG. 12c).

The mandrel coil 200 may be implemented by using one or more endless mandrel belts B0. A mandrel belt B0 may be continuously wound at an input end IN0 of the coil 200, and the belt B0 may be continuously unwound at an output end OUT0 of the coil 200. A part of the moving belt B0 may form the first turn $B0_A$ of the mandrel coil 200 at a first time $t_k$, and the same part of the moving belt B0 may subsequently form the second turn $B0_A$ of the mandrel coil 200 at a second time $t_{k+1}$. A point P0 of the belt B0 may make 360° rotation around the axis REF0 during the time period from $t_k$ to $t_{k+1}$. The point P0 may be at a position $POS(t_k)$ at the time $t_k$, and at a position $POS(t_{k+1})$ at the time $t_{k+1}$. The mandrel coil 200 may have a pitch $p_{AB}$, which is defined by an axial displacement of the point P0 of the surface of the moving mandrel belt B0 when said point P0 is rotated by 360° around the axis REF0 of the mandrel coil 200. The axial displacement may be defined in the direction of the axis REF0.

The mandrel belt B0 may be continuously fed to the input end IN0 of the mandrel coil 200 and the mandrel belt B0 may be continuously unwound from the output end of the mandrel coil 200 such that the surface of the mandrel coil 200 is continuously moving. The mandrel belt B0 may be fed to the input end IN0 of the mandrel coil 200 and the mandrel belt B0 may be unwound from the output end of the mandrel coil 200 so as to move the surface of the first complete turn $B0_A$ of the mandrel coil 200. At least the first complete turn $B0_A$ of the coil 200 may be formed of the mandrel belt B0. A loop of the mandrel belt B0 may be arranged to operate as the first complete turn of the mandrel coil 200.

The mandrel belt B0 may be continuously fed from the output end OUT0 back to the input end IN0 through the coil 200. The mandrel belt B0 may be fed from the output end OUT0 back to the input end IN0 through one or more turns $B0_A$, $B0_B$ of the coil 200. The coil 200 may have a feedback portion (return portion) $B0_R$, which may be guided from the output OUT0 to the input IN0 through the coil. The feedback portion $B0_R$ may be formed from the belt B0. A section $B0_R$ of the belt B0 may continuously run from the output OUT0 to the input IN0 at the velocity $v_0$.

Figure 9:
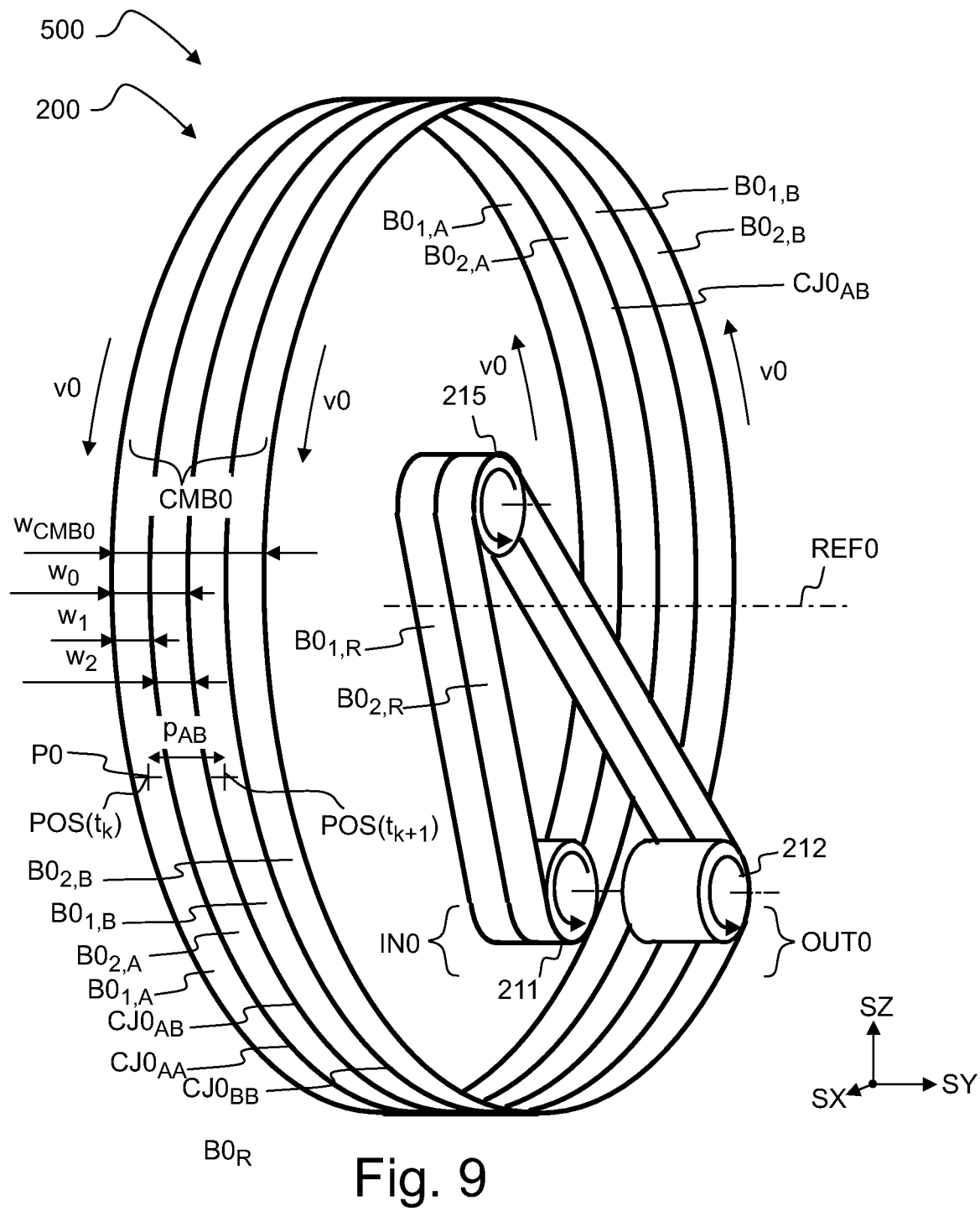
FIG. 9 shows, by way of example, in a three dimensional view, a mandrel coil, which comprises several mandrel belts running in parallel.
Figure 10A:
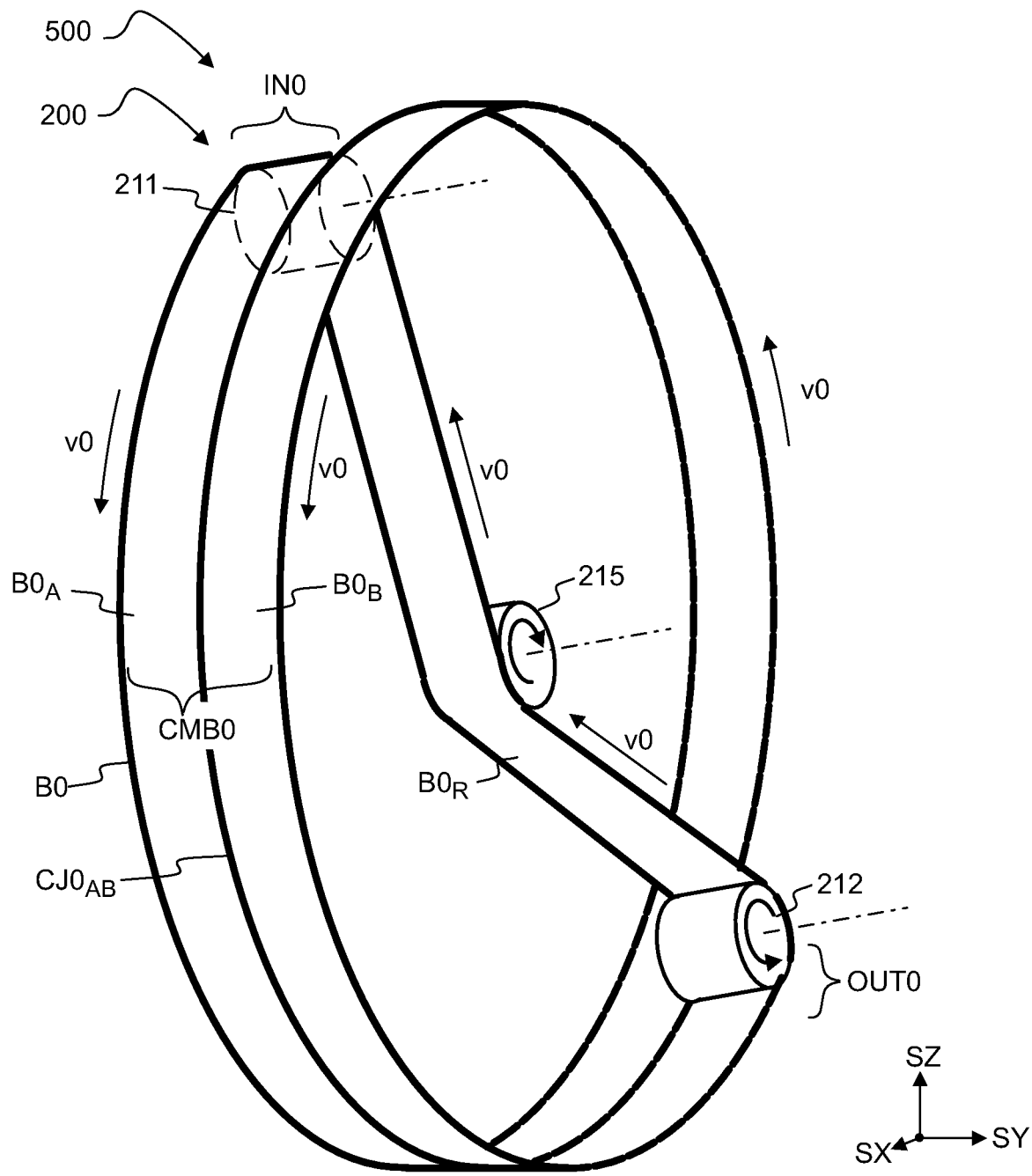
FIG. 10a shows, by way of example, in a three dimensional view, a mandrel coil, which comprises one and a half turns.
Figure 10B:
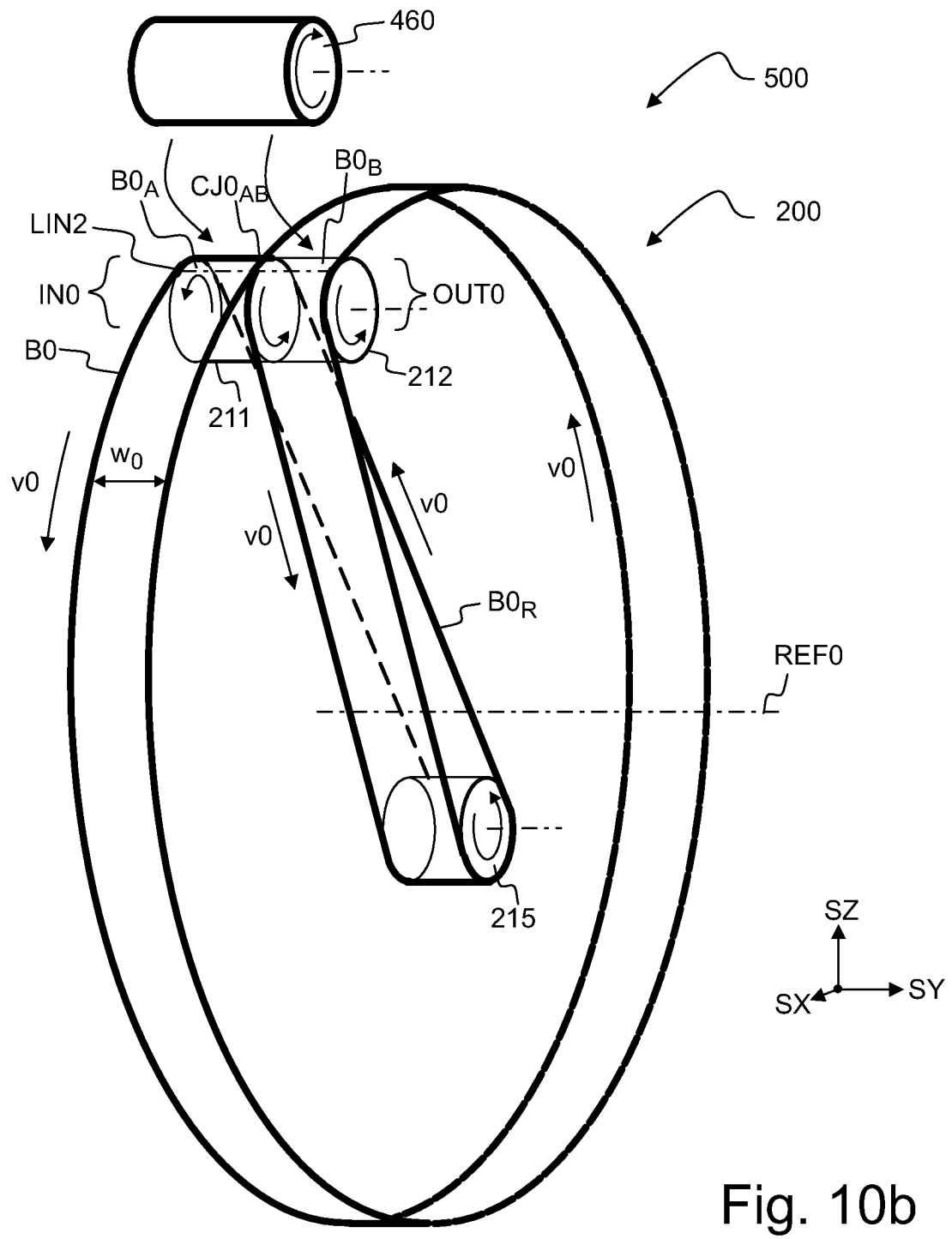
FIG. 10b shows, by way of example, in a three dimensional view, a mandrel coil, which comprises one turn.

The coil 200 may comprise at least one complete turn $B0_A$ formed of the endless mandrel belt B0. The coil 200 may comprise more than one turn. For example, FIG. 1a shows a coil 200 which has two turns $B0_A$, $B0_B$ formed of the endless mandrel belt B0. FIG. 10a shows a coil 200 which has one and a half turns. FIG. 10b shows a coil 200 which has a single turn $B0_A$. FIG. 9 shows a coil 200, which comprises several belts $B0_1$, $B0_2$ running in parallel. Increasing the number of the turns of the coil may increase the effective width $w_{CMB0}$ of the supporting area CMB0. Increasing the number of the turns of the coil may increase the length of a broad portion of the supporting area CMB0.

The supporting surface CMB0 may comprise at least the surface of the first turn $B0_A$ of the coil 200. The combined supporting surface CMB0 may comprise a first portion $B0_A$ of the mandrel belt B0, and a second portion $B0_B$ of the mandrel belt B0. The first portion $B0_A$ may form a first loop of the coil 200, and the second portion $B0_B$ may form a part of a second loop of the coil 200. The second portion $B0_B$ may be adjacent to the first portion $B0_A$. The combined supporting surface CMB0 may comprise a section where the effective width $w_{CMB0}$ of the combined supporting surface CMB0 is greater than the width $w_0$ of the mandrel belt B0. The effective width $w_{CMB0}$ of the combined supporting surface CMB0 may be greater than the pitch $p_{AB}$ of the mandrel coil. The width $w_{CMB0}$ of the supporting surface CMB0 may be e.g. greater than or equal to 1.95 times the pitch $p_{AB}$ of the mandrel belt B0. The width $w_{CMB0}$ of the supporting surface CMB0 may be greater than or equal to two times the width of the mandrel belt B0.

The supporting area CMB0 of the mandrel coil 200 may comprise a first portion $B0_A$ of the mandrel belt B0 and a second portion $B0_B$ of the mandrel belt B0. The second portion $B0_B$ may be adjacent to the first portion $B0_A$ so as to temporarily form a common seam $CJ0_{AB}$. The temporary seam $CJ0_{AB}$ may be continuously formed near the input IN0 of the coil 200, and the seam may be simultaneously disassembled near the output OUT0 of the coil 200. The seam $CJ0_{AB}$ may have a helical shape. The first portion $B0_A$ may be adjacent to the second portion $B0_B$ such that both portions $B0_A$, $B0_B$ move in the same direction at the same velocity $v_0$. The first portion $B0_A$ and the second portion $B0_B$ may be arranged to move at the same velocity $v_0$ in the same direction.

The $w_{CJ0}$ width of the seam $CJ0_{AB}$ may be e.g. smaller than 0.5 mm, so as to as to provide substantially continuous supporting area for the laminated sleeve SLEEVE1. The edge of the first portion $B0_A$ may advantageously be in contact with the edge of the second portion $B0_B$ so that the width of the temporary seam $CJ0_{AB}$ may be substantially equal to zero. The edges of the elongated portions $B0_A$, $B0_B$ may be in contact with each other, or the edges may be separated by a narrow gap. The term "seam" may refer to the common boundary where the elongated edges of portions $B0_A$, $B0_B$ are temporarily in contact with each other and/or to a gap defined by the elongated edges of the adjacent portions $B0_A$, $B0_B$. The width of the temporary seam $CJ0_{AB}$ may be e.g. in the range of 0 to 5 mm, advantageously in the range of 0 to 2 mm.

The length of the common seam $CJ0_{AB}$ may be e.g. greater than 50% of the circumference $L_{CIR0}$ of the mandrel coil 200. Consequently, the length of a broad portion of the supporting surface CMB0 may be e.g. greater than 50% of the circumference $L_{CIR0}$ of the mandrel coil 200.

The apparatus 500 may be arranged to operate such that the strip S1 does not slip with respect to the supporting surface CMB0. The mandrel belt B0 may have a surface, which has high friction coefficient when in contact with the strip S1. The surface of the mandrel belt B0 may comprise elastomer so as to provide high friction coefficient. The mandrel belt B0 may comprise elastomer, in particular natural rubber, polyurethane, polybutadiene, neoprene and/or silicone. The mandrel belt B0 may further comprise reinforcing structural elements, e.g. fibers, yarns and/or wires. The mandrel belt B0 may also be a metal belt. The mandrel belt B0 may comprise e.g. spring steel. The mandrel belt B0 may be made of e.g. spring steel.

The coil 200 may have an axis REF0. The axis REF0 may be called e.g. as reference axis. The combined supporting surface CMB0 may move around the axis REF0 such that the laminated sleeve SLEEVE1 has an axial velocity component $V_{0,y}$. The supporting surface CMB0 may simultaneously rotate around the axis REF0 and move in the axial direction, i.e. in the direction of the axis REF0. Each point P0 of the surface CMB0 may propagate around the axis REF0 along a helical path such that the velocity $v_0$ of the point P0 has a tangential velocity component $V_{0,T}$, and an axial velocity component $V_{0,y}$.

The supporting surface CMB0 may precisely define the inner circumference $L_{CIR0}$ of the sleeve SLEEVE1. A first strip S1 may be fed on top of the supporting surface CMB0, and a second strip S2 may be fed on top of the first strip S1. The supporting surface CMB0 may facilitate aligning a next portion of first strip S1 with respect to a previously laminated portion of said first strip S1.

SX, SY, and SZ may denote orthogonal directions. The direction SY may be parallel with the axis REF0 of the coil 200. The directions SX, SY, and SZ may define a stationary frame. The directions SX, SY, and SZ may be fixed with respect to the direction of gravity. The axis REF0 of the coil 200 may have any orientation with respect to the direction of gravity.

For example, the axis REF0 of the coil 200 may be substantially horizontal. The horizontal orientation of the axis REF0 may e.g. provide high accuracy for the axial position of the strips S1, S2, as the gravity does not deflect the strips in the axial direction.

For example, the axis REF0 of the coil 200 may be substantially vertical. The axis REF0 may be substantially parallel with the direction of gravity. The vertical orientation of the axis REF0 may be used e.g. when the strips S1, S2 are thin and/or when the sleeve SLEEVE1 is very long. In that case the sleeve SLEEVE1 may hang vertically from the coil 200, which has the vertical axis REF0.

The apparatus 500 may comprise one or more rollers 211 for unwinding the belt B0 from the coil 200. The apparatus 500 may comprise one or more rollers 212 for feeding the belt B0 to the input end IN0 of the coil 200. The apparatus 500 may comprise one or more rollers 215 for guiding the belt B0 from the output OUT0 to the input IN0. The apparatus 500 may comprise one or more rollers 215 for adjusting the longitudinal tension of the belt B0. The rollers may also be called e.g. as pulleys.

Figure 1B:
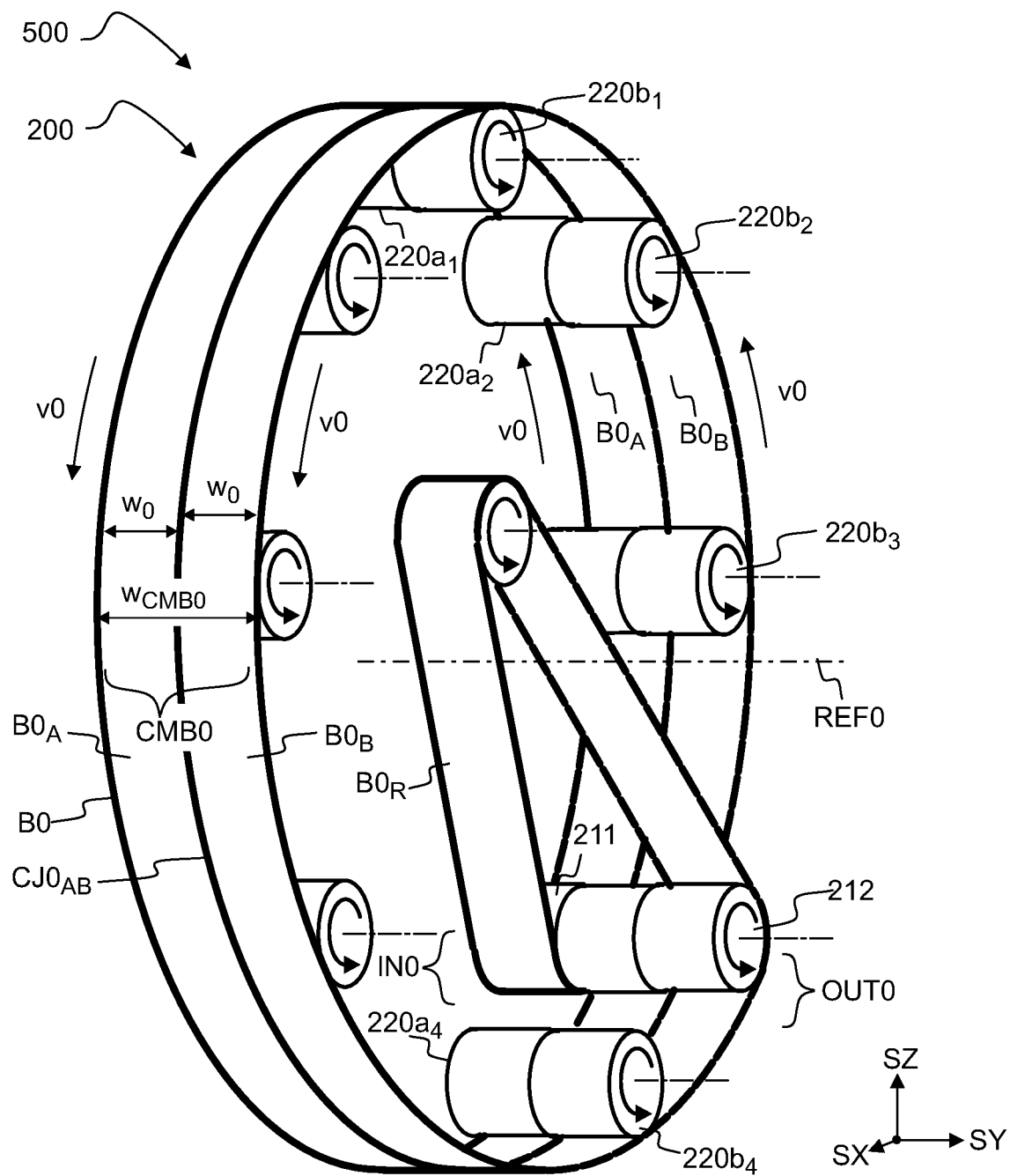
FIG. 1b shows, by way of example, in a three dimensional view, a plurality of support elements of the mandrel coil.

Referring to FIG. 1b, the mandrel belt B0 may be supported by a plurality of support elements $220a_1$, $220a_2$, ... $220b_1$, $220b_2$, .... The support elements may be e.g. rollers so as to allow moving the belt B0 with respect to the support elements in a situation where the belt has high longitudinal stress and/or when the strips S1, S2 are pressed against the mandrel coil 200 with a high force.

The shape and the axial position of the mandrel belt B0 may be defined by a plurality of supporting rollers $220a_1$, $220a_2$, ... $220b_1$, $220b_2$, .... The supporting rollers may define e.g. a substantially circular shape of the mandrel coil, when viewed in the direction of the axis REF0. The mandrel coil may provide a substantially cylindrical supporting surface CMB0.

A first set of rollers $220a_1$, $220a_2$, $220a_3$ ... may support the first turn $B0_A$ of the coil 200. A second set of rollers $220b_1$, $220b_2$, $220b_3$ ... may support the second turn $B0_B$ of the coil 200. A first roller $220a_1$ may be adjacent to a second roller $220b_1$. The axis of rotation of the first roller $220a_1$ may substantially coincide with the axis of rotation of the second adjacent roller $220b_1$, so as to provide a substantially cylindrical supporting surface CMB0. Alternatively, the orientation of the axis of rotation of the first roller may be different from the orientation of the axis of rotation of the second roller so as to minimize torsion and/or geometric deformation of the mandrel belt B0.

The belt B0 may also be arranged to slide on a surfaces of one or more support elements in the direction of the velocity v0. The apparatus may comprise one or more sliding support elements $220a_1$, $220a_2$, ... $220b_1$, $220b_2$, ....

Referring to FIG. 2a, the apparatus 500 may comprise one or more feeding units FUNIT1, FUNIT2 to define the axial position and/or orientation of one or more strips S1, S2 with respect to the coil 200. A feeding unit UNIT1, UNIT2 may comprise one or more steering elements to define the axial positions of a strip S1, S2 and/or the orientation of the strip S1, S2. A feeding unit UNIT1, UNIT2 may comprise e.g. one or more rollers and/or sliding elements to define the axial positions of a strip S1, S2 and/or the orientation of the strip S1, S2.

The first strip S1 may be fed on the coil 200 e.g. from a roll RLL1. The second strip S2 may be fed on the coil 200 e.g. from a roll RLL2. The first strip S1 may meet the surface of the coil 200 at a contact line LIN1. The second strip S2 may meet the first strip S1 at a contact line LIN2.

LE1 may denote a front end of the strip S1. LE2 may denote a front end of the strip S2. The ends LE1, LE2 may also be called e.g. as leading ends. The ends LE1, LE2 may exist during an initial phase of the winding. The strips S1, S2 may be continuously wound during operation so that the sleeve SLEEVE1 does not comprise the (perpendicular) ends LE1, LE2.

The surface of the coil 200 may pull the strip S1 with a pulling force $F_1$. The first strip S1 may pull the second strip with a pulling force $F_2$. The feeding unit FUNIT1 may comprise e.g. a first brake to control the longitudinal tension of the strip S1. The feeding unit FUNIT1 may comprise e.g. a second brake to control the longitudinal tension of the strip S2.

The apparatus 500 may comprise one or more of the rollers which may be arranged to move the belt B0. The apparatus 500 may comprise a driving mechanism to move the belt B0. The apparatus 500 may comprise one or more motors M1 for driving the belt B0. One or more of the rollers may be coupled e.g. to a motor M1 so as to move the belt B0 at the velocity $v_0$. The motor M1 may be coupled e.g. to a roller 215. The belt B0 may also be a toothed belt, and a motor M1 may be arranged to move the belt by using a toothed pulley.

Referring to FIG. 2b, the strips S1, S2 may be continuously wound on the moving surface CMB0 of the coil 200 so as to form the laminated sleeve SLEEVE1. The moving surface CMB0 of the coil 200 may pull the strip S1 to the coil 200. The coil 200 may wind the strip S1 on the coil 200. The moving surface CMB0 of the coil 200 may operate as a winder, which also moves the formed sleeve SLEEVE1 in the axial direction during the winding.

An edge of a first portion $S1_A$ of the strip S1 and an edge of second portion $S1_B$ of the strip S1 may have a common helical seam J1. The second strip S2 may be fed on the strip S1 such that the second strip S2 overlaps the seam J1. The edge of the first portion $S2_A$ of the strip S2 and the edge of the second portion $S2_B$ of the strip S2 may have a common helical seam J2.

The first portion $S1_A$ may be a first turn of a first wound layer of the sleeve SLEEVE1 at a time $t_k$. The second portion $S1_B$ may be a second turn of the first wound layer of the sleeve SLEEVE1 at the time $t_k$. The first layer may further comprise e.g. a third turn $S1_C$ and a fourth turn $S1_D$. The material of the first turn $S1_A$ may be displaced to the position of the second turn $S1_B$, to the position of the third turn $S1_C$, and to the position of the fourth turn $S1_D$ after one, two and three complete revolutions of the sleeve SLEEVE1 around the axis REF0.

The first portion $S2_A$ may be a first turn of a second wound layer of the sleeve SLEEVE1 at the time $t_k$. The second portion $S2_B$ may be a second turn of the second wound layer of the sleeve SLEEVE1 at the time $t_k$. The second layer may further comprise e.g. a third turn $S2_C$ and a fourth turn $S2_D$. The material of the first turn $S2_A$ may be displaced to the position of the second turn $S2_B$, to the position of the third turn $S2_C$, and to the position of the fourth turn $S2_D$ after one, two and three complete revolutions of the sleeve SLEEVE1 around the axis REF0.

An article 100 may be formed from the sleeve by cutting along cutting lines CUT1, CUT2. The article 100 may be an endless spiral wound abrasive article. The cutting lines CUT1, CUT2 may be substantially parallel with a reference plane XZ, which is perpendicular to the axis REF0 of the mandrel coil 200. The reference plane XZ may be defined by the directions SX and SZ.

Referring to FIG. 3a, the mandrel coil 200 may have a pitch $p_{AB}$, which is defined by an axial displacement of a point P0 of the surface of the moving mandrel belt B0 when said point P0 is rotated by 360° around the axis REF0 of the mandrel coil 200. The axial displacement may be defined in the direction of the axis REF0.

The angle $\gamma_0$ may denote an angle between the direction of movement $v_0$ of the point P0 and the reference plane XZ, which is perpendicular to the axis REF0 of the mandrel coil 200. The angle $\gamma_0$ may be called e.g. as the belt angle. The angle $\gamma_0$ may be greater than zero so as to allow continuous movement of the SLEEVE1 in the axial direction and to allow continuous forming of the sleeve SLEEVE1.

The belt angle $\gamma_0$ may be e.g. in the range of 1.0° to 2.5°, in the range of 1.0° 35 to 5.0°, or even in the range of 1.0° to 10.0°. The belt angle $\gamma_0$ may be e.g. in the range of 1.0° to 2.5°. The belt angle $\gamma_0$ may be e.g. in the range of 2.5° to 5.0°. The belt angle $\gamma_0$ may be e.g. in the range of 5.0° to 10.0°. The ratio of the pitch $p_{AB}$ to the circumference $L_{CIR0}$ may be substantially equal to $\tan(\gamma_0)$. The ratio of the pitch $p_{AB}$ to the circumference $L_{CIR0}$ may be e.g. in the range of 0.017 to 0.044, corresponding to the angular range of 1.0° to 2.5°. The ratio of the pitch $p_{AB}$ to the circumference $L_{CIR0}$ may be e.g. in the range of 0.017 to 0.087, corresponding to the angular range of 1.0° to 5.0°. The ratio of the pitch $p_{AB}$ to the circumference $L_{CIR0}$ may be e.g. in the range of 0.017 to 0.176, corresponding to the angular range of 1.0° to 10.0°.

Using a small belt angle may e.g. reduce the risk of producing visible defects (i.e. marks) on the surface of the object OBJ1 when grinding the object OBJ1 with the produced article 100. The belt angle $\gamma_0$ may be e.g. in the range of 1.0° to 2.5° so as to improve dimensional stability of the produced article 100 and/or in order to provide high surface quality when using the article 100 for grinding.

FIG. 3b shows, by way of example, the tangential component $v_{0,T}$ and the axial component $V_{0,y}$ of the velocity $v_0$. The tangential component $v_{0,T}$ may be equal to $v_0 \cdot \cos(\gamma_0)$. The axial component $V_{0,y}$ may be equal to $v_0 \cdot \sin(\gamma_0)$.

Figure 3C:
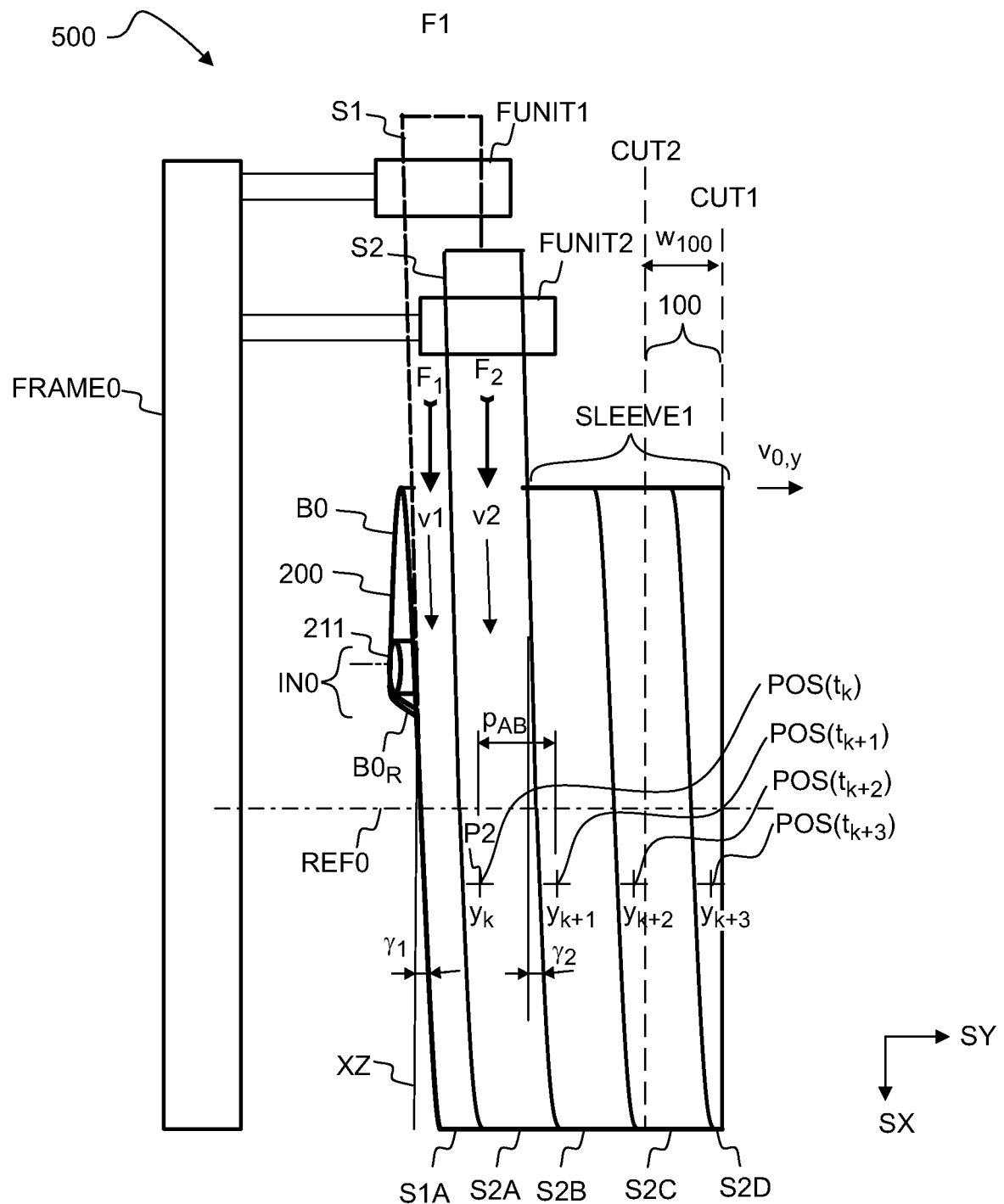
FIG. 3c shows, by way of example, in a side view, the sleeve formed on the mandrel coil.

Referring to FIG. 3c, the ratio of the pitch $p_{AB}$ to the circumference $L_{CIR0}$ of the coil 200 may define the orientation angle $\gamma_1$ of the first strip S1 and the orientation angle $\gamma_2$ of the second strip S2.

The orientation angle $\gamma_1$ of the first strip S1 and the orientation angle $\gamma_2$ of the second strip may be defined by the angle $\gamma_0$. The orientation angle $\gamma_1$ of the first strip S1 and the orientation angle $\gamma_2$ of the second strip may be substantially equal to the angle $\gamma_0$. The angles $\gamma_1$, $\gamma_2$ may also be called e.g. splice angles.

The sleeve SLEEVE1 may move in the axial direction such that a point P2 of the (outermost) strip S2 may be at a position POS($t_k$) at a time $t_k$, at a position POS($t_{k+1}$) at a time $t_{k+1}$, at a position POS($t_{k+2}$) at a time $t_{k+2}$, and at a position POS($t_{k+3}$) at a time $t_{k+3}$. $y_k$, $y_{k+1}$, $y_{k+2}$, $y_{k+3}$ may denote the axial coordinates of the positions POS($t_k$), POS($t_{k+1}$), POS($t_{k+2}$), POS($t_{k+3}$), respectively. The sleeve may make a first complete rotation (360°) about the axis REF0 during the time period from $t_k$ to $t_{k+1}$. The sleeve may make a second complete rotation (360°) about the axis REF0 during the time period from $t_{k+1}$ to $t_{k+2}$. The sleeve may make a third complete rotation (360°) about the axis REF0 during the time period from $t_{k+2}$-$t_{k+3}$.

The difference $t_{k+1}$-$t_k$=$\Delta T$ may denote the time period needed for one complete revolution (360°) of the sleeve. A point P0 of the mandrel belt B0 may make 360° rotation around the axis REF0 during the time period from $t_k$ to $t_{k+1}$. A point P2 of the strip S2 may make 360° rotation around the axis REF0 during the time period from $t_k$ to $t_{k+1}$. The tangential velocity component of the belt B0 may be substantially equal to $v_0 \cdot \cos(\gamma_0)$, where the angle $\gamma_0$ denotes the angle between the velocity $v_0$ and a plane, which is perpendicular to the axis REF0. The time period $\Delta T$ may be equal to $L_{CIR0}/(v_0 \cdot \cos(\gamma_0))$. The axial velocity component $v_{0,y}$ of the belt B0 may be equal to $p_{AB}/\Delta T$. The axial velocity component $v_{0,Y}$ of the sleeve SLEEVE1 may be equal to $p_{AB}/\Delta T$.

S1$_A$ may denote a first turn of the first strip S1. S2$_A$, S2$_B$, S2$_C$, S2$_D$ may denote (four) adjacent turns of the second strip S2.

Figure 3D:
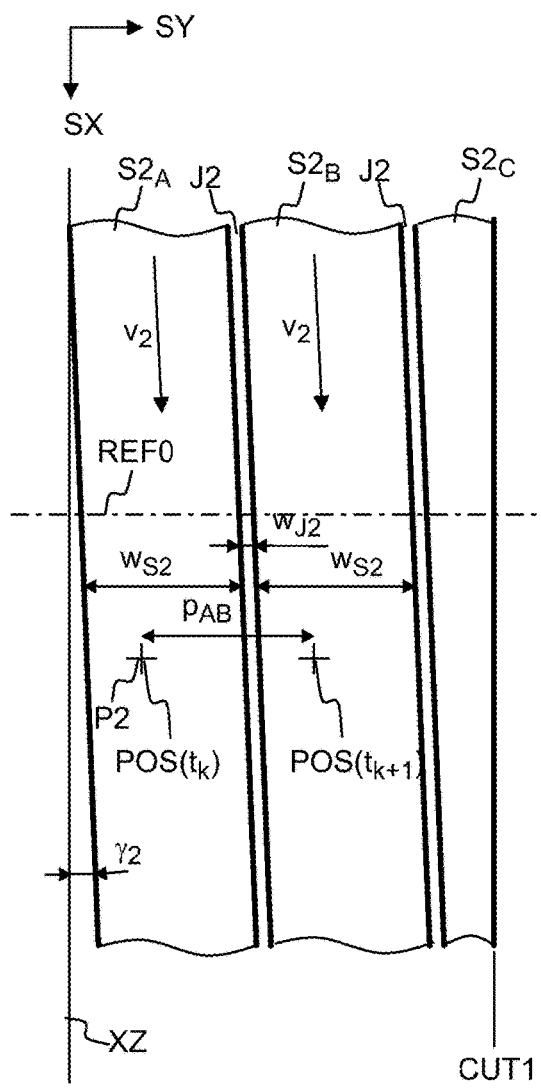
FIG. 3d shows, by way of example, in a side view, positions of strip portions on the mandrel coil.
Figure 3E:
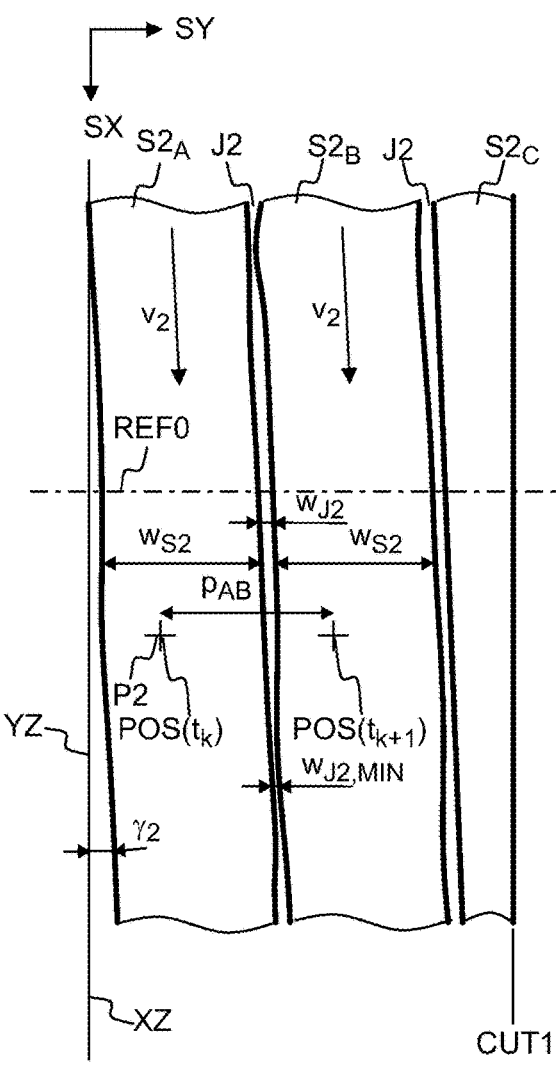
FIG. 3e shows, by way of example, in a side view, positions of strip portions on the mandrel coil.

Referring to FIGS. 3d and 3e, the (outermost) strip S2 may be fed onto the bottom strip S1 such that the width of the seam J2 is substantially greater than zero at any location. This may reduce the risk that a first portion of the strip S2 could form a protrusion by pushing an adjacent strip S2. This may help to avoid producing local protrusions, which could cause defects during grinding.

The strip S2 may be fed such that the sum of the width $w_{S2}$ of the strip S2 and the width $w_{J2}$ of the seam J2 at any location of the sleeve SLEEVE1 is substantially constant. The belt B0 and the strips S1, S2 are inclined with respect to the axis REF0. The sum of the width $w_{S2}$ of the strip S2 and the width $w_{J2}$ of the seam J2 may be equal to the product $p_{AB} \cdot \cos(\gamma_2)$. The pitch $p_{AB}$ and/or the width $w_{S2}$ may be selected according to the manufacturing tolerances so as to ensure that the width of the gap J2 may remain substantially greater than zero. The inclination angle $\gamma_2$ may be taken into consideration when selecting the suitable pitch $p_{AB}$ and/or width $w_{S2}$. The width $w_{J2,Y}$ of the seam J2, when measured in the axial direction SY, may be given e.g. by the following equation:

$$w_{J2,Y} = p_{AB} - \frac{w_{S2}}{\cos(\gamma_2)} \quad (1)$$

The width of the belt B0 and the widths of the strips S1, S2, when measured in the direction of the axis REF0, may be slightly greater than the width of the belt B0 and the widths of the strips S1, S2, when measured in a direction which is perpendicular to the edge of the belt B0. The width $w_{S2}$ used in equation (1) may be the width of the strip S2 when measured in a direction, which is perpendicular to the edge of the strip S2. The difference $(1-\cos(y_2))$ between one and the cosine term $\cos(y_2)$ is smaller than 0.001 when the orientation angle $\gamma_2$ is smaller than 2.5°. The width $w_{S2}$ of the strip S2 may be e.g. 100 mm, the angle $\gamma_2$ may be e.g. 2.5°. Consequently, the width of the strip S2 in the axial direction may be equal to 100.10 mm (=100 mm/$\cos(\gamma_2)$). Equation (1) may be used e.g. when the feeding unit FUNIT2 is arranged to feed the strip S2 such that the axial position of an edge of the strip S2 is fixed.

The strip S2 may have a minimum width $w_{S2,MIN}$ and a maximum width $w_{S2,MAX}$, and the seam J2 may have a minimum width $w_{J2,MIN}$ and a maximum width $w_{J2,MAX}$. The maximum width $w_{J2,MAX}$ of the seam J2 may be selected to be greater than or equal to the difference $(w_{S2,MAX}-w_{S2,MIN})$ between the maximum width $w_{S2,MAX}$ and the minimum width $w_{S2,MIN}$. The difference $(w_{S2,MAX}-w_{S2,MIN})$ may also be called as a manufacturing tolerance of the strip S2. The transverse position of the strip S2 at the contact line LIN2 may be selected such that the width $w_{J2,MAX}$ of the seam J2 is substantially greater than zero at any location.

The width $w_{S2}$ of the second strip S2 may be selected to be e.g. in the range of 0.950 to 0.999 times the pitch $p_{AB}$. The pitch $p_{AB}$ may be selected to be e.g. in the range of 1.001 to 1.050 times the width $w_{S2}$. The width $w_{S1}$ of the bottom strip S1 may be e.g. substantially equal to the width $w_{S2}$ of the second strip S2.

The width of the outermost strip (e.g. S1, S2 or S3) may be e.g. in the range of 5 mm to 1000 mm. The width of the outermost strip (e.g. S1, S2 or S3) may be e.g. in the range of 10 mm to 100 mm. The width $w_{S2}$ of the strip S2 may be e.g. in the range of 10 mm to 100 mm. The width $w_{S1}$ of the innermost strip S1 may be e.g. substantially equal to the width $w_{S2}$ of the strip S2.

Figure 4A:
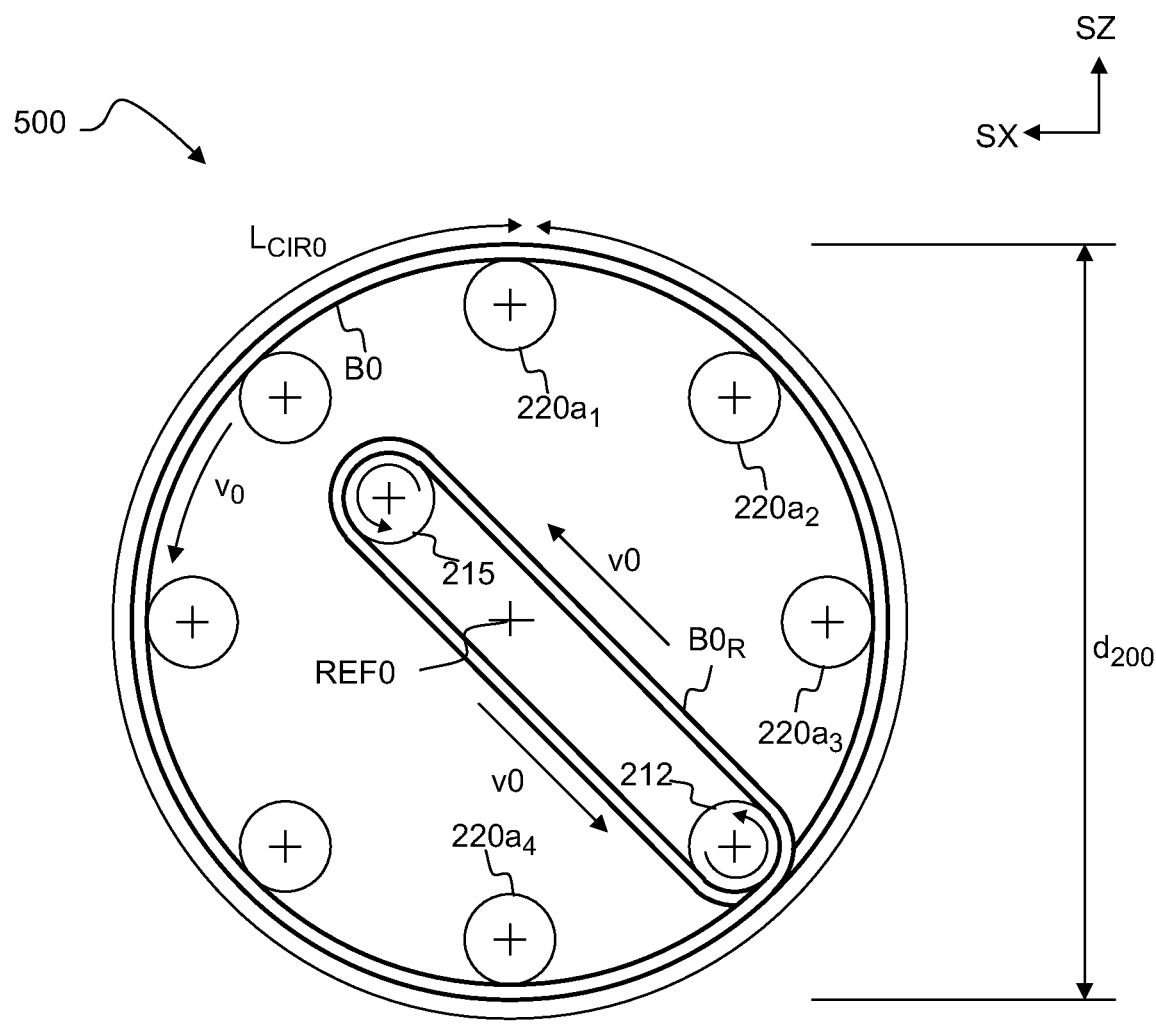
FIG. 4a shows, by way of example, in an axial view, the mandrel coil.

FIG. 4a shows, by way of example, the circumferential length $L_{CIR0}$ of the coil 200. Any desired inner circumferential length of the sleeve SLEEVE1 may be provided by selecting the circumferential length $L_{CIR0}$ of the coil 200.

Figure 4B:
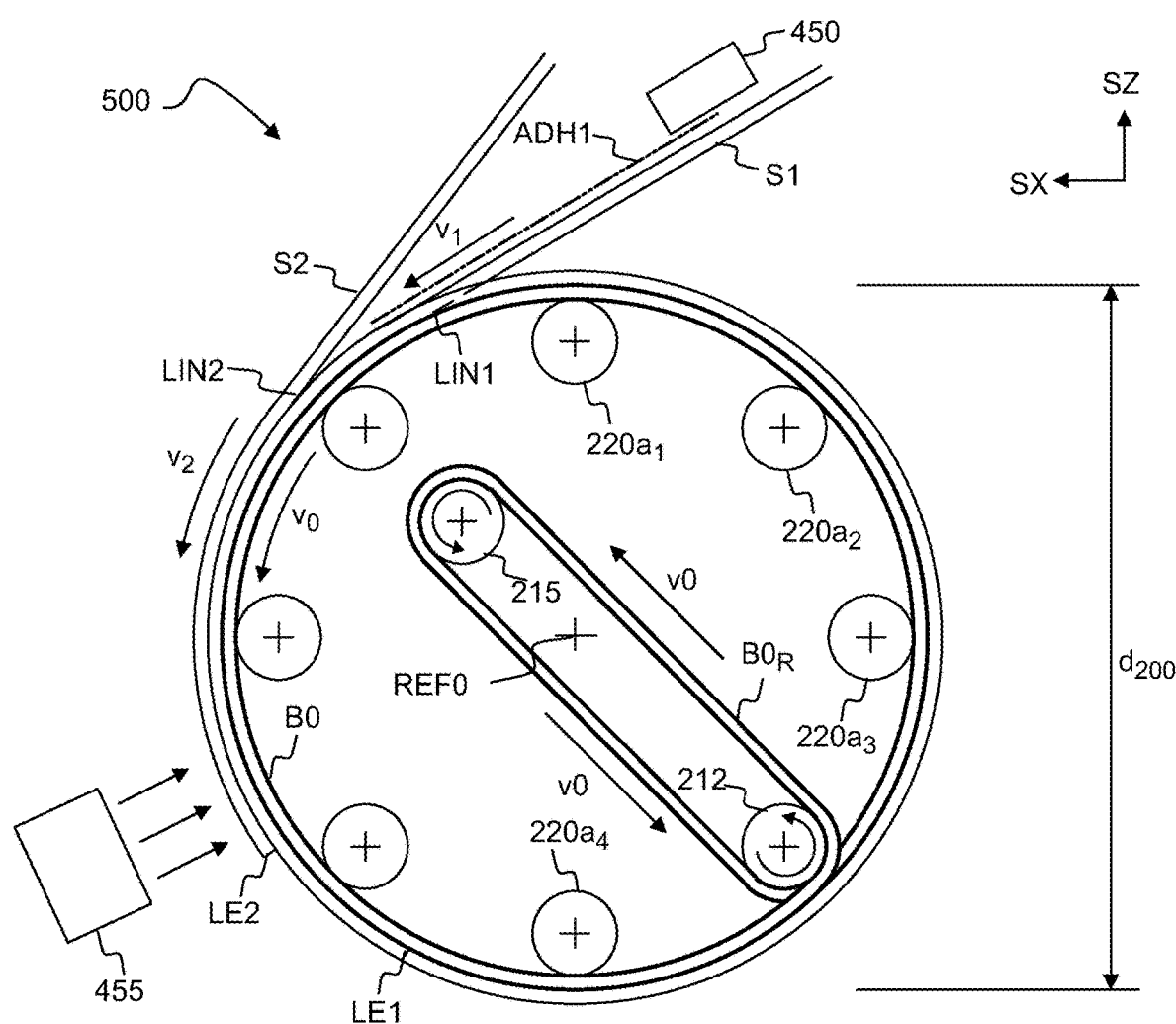
FIG. 4b shows, by way of example, in an axial view, feeding a bottom strip and a second strip on the mandrel coil.

Referring to FIG. 4b, the method may comprise applying an adhesive ADH1 on the bottom strip S1 and/or on the second strip S2. The apparatus 500 may comprise an adhesive application unit 450 for disposing the adhesive ADH1 on the bottom strip S1 and/or on the second strip S2. The adhesive ADH1 may form an adhesive bond between the strips S1, S2. The application unit 450 may comprise e.g. one or more nozzles, rollers, and/or brushes to apply the adhesive ADH1 to the strip S1 and/or S2.

Substantially the whole upper or lower (broad) surface of a strip S1 may be covered with the adhesive ADH1, so as to provide a strong bond.

Alternatively, the adhesive ADH1 may cover less than 70%, less than 50%, or even less than 10% of the interface between the strips S1, S2, e.g. in order to reduce consumption of the adhesive, to improve flexibility and/or to provide a structure which allows an air flow through the interface between the strips S1, S2.

The velocity $v_0$ of the belt B0 may be e.g. in the range of 0.01 m/s to 10 m/s. A high velocity $v_0$ may provide increased production rate. The maximum limit of the velocity $v_0$ may be defined e.g. by the properties of the adhesive. On the other hand, a low velocity $v_0$ may provide high dimensional accuracy and/or may provide plenty of time for curing the adhesive.

The adhesive ADH1 may be e.g. a pressure sensitive adhesive and/or a hot melt adhesive. The adhesive ADH1 may be a reactive adhesive. The reactive adhesive may include one or more compositions which react e.g. by polymerizing and/or cross-linking. The adhesive may reach a predetermined strength e.g. after a time period of 0.1 s, 1 s, 10 s, 60 s, 1 h, 24 h, or 30 days. Said time period may start when a point of the strip S2 is brought into contact with the strip S2. The adhesive ADH1 may comprise e.g. pressure sensitive adhesive, hot melt adhesive, thermosetting resin, radiation curable adhesive, epoxy resin, acrylic adhesive, urethane adhesive, polyvinyl acetate resin, phenolic resin, amino resin, and/or latex resin. The adhesive ADH1 may comprise reactive hot melt resin. The adhesive ADH1 may comprise e.g. a blend of thermosetting and thermoplastic resins. The composition of the adhesive ADH1 may be selected such that it may be activated upon application pressure, heat, and/or radiation. The composition of the adhesive ADH1 may be selected such that it is cured upon application pressure, heat, and/or radiation. The apparatus 500 may comprise one or more pressing elements 460 to press the strips S1, S2. The apparatus 500 may optionally comprise one or more curing units 455 to provide heat, light, radiation and/or an electron beam. The curing unit 455 may comprise e.g. an infrared heater to heat the strips S1, S2 and/or a UV lamp to irradiate the strips S1, S2. The composition of the adhesive ADH1 may be selected such that the adhesive may be activated and/or cured by irradiating with ultraviolet (UV) light. The curing unit 455 may comprise e.g. an electron accelerator for generating an electron beam (EB) and for irradiating the adhesive with the electron beam. The composition of the adhesive ADH1 may be selected such that the adhesive may be cured by the electron beam.

An adhesive layer ADH1 applied on the strip S1, S2 may be irradiated before the adhesive layer passes the contact line LIN2, and/or after the adhesive layer has passed the contact line LIN2. The adhesive layer ADH1 may be tackified by UV light before and/or after the contact line LIN2. The adhesive layer ADH1 may be cured with UV light after the adhesive layer has passed the contact line LIN2. For example, the bottom strip S1 may comprise a layer of abrasive grains G1, the second strip S2 may be transparent to UV light, and the sleeve SLEEVE1 may be irradiated with UV light after the strip S2 has been brought into contact with the strip S1 so as cure the adhesive. The article 100 may be turned inside out after the cutting so that the abrasive grains will be on the outermost layer.

One or more curing units 455 may also be positioned inside the mandrel coil 200. The mandrel belt B0 may be at least partly transparent to light (e.g. infrared light, laser light and/or UV light). The belt B0 may allow transmission of light from the unit 455 through the belt B0 to the adhesive layer. The mandrel belt B0 may comprise e.g. perforations and/or a mesh structure, which allows transmission of light. The mandrel belt B0 may comprise e.g. transparent polymer to allow transmission of light.

The strip S1 and/or S2 may also comprise a pre-coated layer of adhesive ADH1. The roll RLL1 and/or RLL2 may comprise e.g. a strip S1, S2, an adhesive layer, and a release layer. The release layer may be peeled away before the first strip is brought into contact with the second strip. The roll RLL1, and/or RLL2 may comprise a pressure sensitive adhesive tape, which comprises at least one layer of abrasive grains.

An adhesive layer may also be transferred to the strip S1 or S2 by using a carrier film. The carrier film may carry an adhesive layer. The adhesive layer may be brought into contact with the strip S1 or S2 in order to transfer the adhesive layer from the carrier film to the strip S1 or S2. The carrier film may be subsequently peeled away from the adhesive layer so as to provide a combination formed of the strip and an exposed layer of adhesive.

The mandrel belt B0 may optionally be heated or cooled. A heated belt B0 may be used e.g. for curing an adhesive. A cooled belt B0 may be used e.g. to accelerate cooling of hot melt adhesive.

Figure 4C:
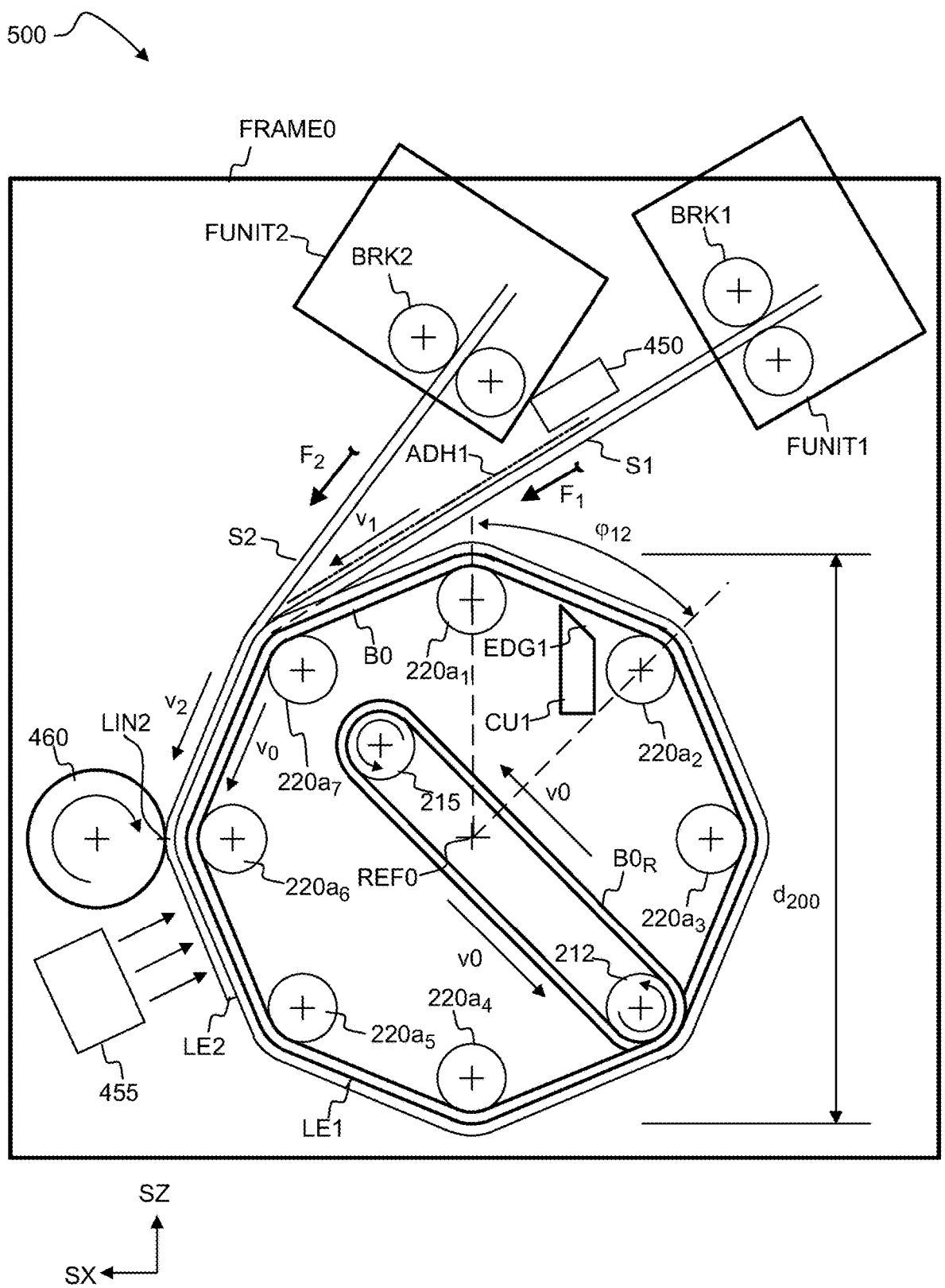
FIG. 4c shows, by way of example, in an axial view, forming a sleeve by feeding a bottom strip and a second strip on the mandrel coil.

Referring to FIG. 4c, the first strip S1 may be fed to the coil 200 under longitudinal tension. The second strip S2 may be fed on the first strip S1 under longitudinal tension. The apparatus 500 may comprise a tension control unit BRK1 for controlling a tension force F1 of the first strip S1. The apparatus 500 may comprise a tension control unit BRK2 for controlling a tension force $F_2$ of the second strip S2. The tension control unit BRK1, BRK2 may comprise e.g. a brake. $v_1$ may denote the velocity of the strip S1 at the contact line LIN2. $v_2$ may denote the velocity of the strip S2 at the contact line LIN2. The velocity $v_1$ and the velocity $v_2$ may be substantially equal to the velocity $v_0$ of the belt B0.

The lamination of the sleeve SLEEVE1 may be optionally assisted by using one or more pressing elements 460. The pressing element 460 may be e.g. a roller, which forms a nip together with one or more supporting elements (e.g. with elements $220a_6$, $220b_6$). The pressing element 460 may be arranged to press the strip S2 against the strip S1 near the contact line LIN2, or at the contact line LIN2. The apparatus 500 may comprise one or more pressing elements 460 to press the strip S2 against the strip S1. The apparatus 500 may comprise one or more pressing elements 460 to press the laminated sleeve SLEEVE1 against the coil 200.

The friction between the bottom strip S1 and the mandrel belt B0 may be so high that the movement of the mandrel belt B0 may pull the bottom strip S1 onto the mandrel coil 200. The mandrel coil 200 may be arranged to pull the bottom strip S1 with a pulling force $F_1$, which may be substantially equal to the tensioning force generated by a tension control unit BRK1. The friction between the bottom strip S1 and the mandrel belt B0 may be so high that the difference between the velocity of the strip S1 supported by the mandrel belt B0 and the velocity of the mandrel belt B0 is less than 1% of the velocity $v_0$ of the mandrel belt B0. The friction between the bottom strip S1 and the mandrel belt B0 may be so high that the bottom strip S1 does not slip in the axial direction (in the direction SY) with respect to the mandrel coil (200). The rotating sleeve SLEEVE1 may be arranged to pull the strip S2 with a pulling force $F_2$, which may be substantially equal to the tensioning force generated by a tension control unit BRK2.

The angle $\varphi_{12}$ may denote angular separation between neighbouring supporting elements $220a_1$, $220a_2$. The apparatus 500 may comprise a plurality of supporting elements $220a_1$, $220a_2$, $220a_3$, . . . so as to provide a substantially circular cross-sectional form for the coil 200, when viewed in the direction of the axis REF0. The angle $\varphi_{12}$ may be e.g. in the range of 5° to 90°, preferably in the range of 10° to 30°. The value $\varphi_{12}=10°$ may mean that a complete turn $B0_A$ of the coil 200 may be supported by 36 rollers $220a$, $220b$, . . . . . The value $\varphi_{12}=20°$ may mean that a complete turn $B0_A$ of the coil 200 may be supported by 18 rollers $220a_1$, $220a_2$, $220a_3$, . . . . The number of elements $220a_1$, $220a_2$, . . . supporting the first turn B0A of the coil 200 may be e.g. in the range of 3 to 1000, preferably in the range of 8 to 100.

The dimension $d_{200}$ may denote an effective diameter of the coil 200.

The deviation of the cross-sectional shape of the coil 200 from a perfect circle may be reduced by increasing the number of the supporting rolls. The quality of the laminated sleeve may be improved by increasing the number of the supporting rolls. The substantially circular shape of the coil 200 may reduce and/or minimize sliding of the strip S2 with respect to the strip S1 after the strip S2 has been brought into contact with the strip S1 at the contact line LIN2. Avoiding the relative sliding may improve the strength of the adhesive bond between the strips S1 and S2. Avoiding the relative sliding may facilitate preserving the precise orientation and position of the strip S2. The substantially circular shape of the coil 200 may also facilitate minimizing the consumption of the adhesive ADH1 (per unit area of the strip S1). The substantially circular shape may facilitate minimizing the thickness of the adhesive layer between the strips S1, S2. The substantially circular shape may facilitate minimizing bleeding of the adhesive ADH1 through the seams J1, J2. The substantially circular shape may facilitate maximizing the flexibility of the article 100.

The apparatus 500 may have a frame FRAME0. The axial position of the coil 200 may be substantially stationary with respect to the frame FRAME0. The positions of the supporting rollers $220a_1$, $220a_2$, $220a3$, . . . $220b_1$, $220b_2$, $220b_3$, . . . of the coil 200 may be substantially stationary with respect to the frame FRAME0. During continuous operation, the axial positions of the feeding units FUNIT1, FUNIT2 (in the direction of the axis REF0) may be substantially stationary with respect to the frame FRAME0. During continuous operation, the axial positions of the strips S1, S2 and the orientation of the strips S1, S2 at the contact line LIN2 may remain substantially constant.

The apparatus 500 may also be arranged to adjust the axial positions of the strips S1, S2 and/or the orientations of the strips S1, S2 e.g. in order to optimize the width of the seams J1, J2. The adjustment may be performed before continuous operation and/or during continuous operation. The apparatus may comprise one or more position sensors (e.g. the sensor SEN2 in FIG. 5) to monitor the position of the seam J1, J2 of the sleeve and/or to detect the width of the seam J1, J2. The apparatus may be arranged to control the axial positions and/or orientations of the strip S1, S2 based on signals obtained from the position sensors. The position sensors may be e.g. optical position sensors. The apparatus may comprise e.g. a machine vision system to monitor the seams of the sleeve. The apparatus may be arranged to fine-tune the axial positions and/or orientations in real time during continuous movement of the mandrel belt B0. The feeding unit FUNIT1, FUNIT2 may comprise one or more actuators for making small adjustments to the path of the strip S1, S2.

Figure 4D:
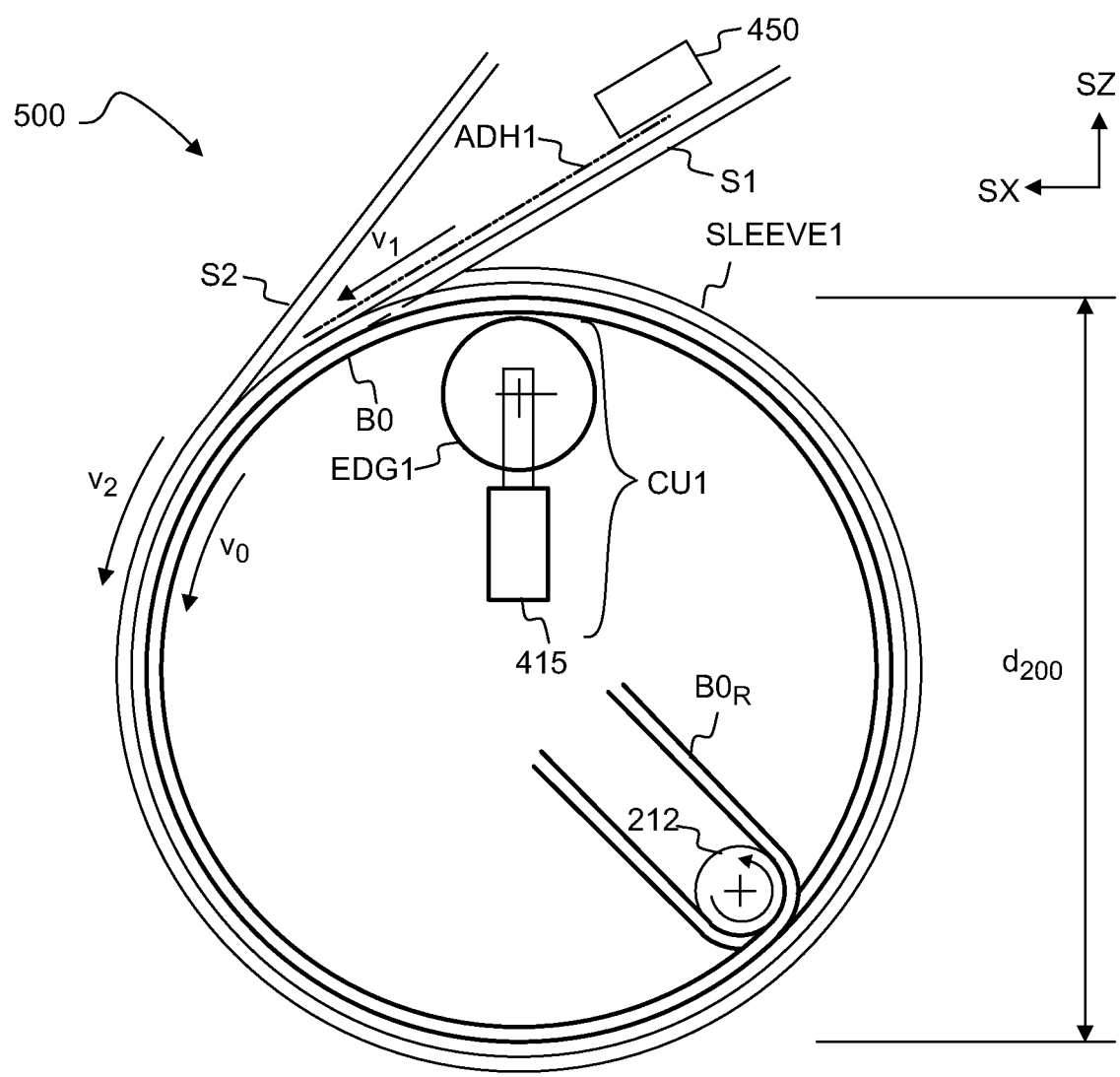
FIG. 4d shows, by way of example, in an axial view, forming a sleeve by feeding a bottom strip and a second strip on the mandrel coil.

Referring to FIG. 4d, the apparatus 500 may comprise one or more cutting units CU1 for cutting the sleeve SLEEVE1. The cutting unit CU1 may comprise e.g. one or more cutting edges EDG1.

Referring to FIG. 4d, the cutting unit CU1 may comprise e.g. one or more cutting discs EDG1. The cutting unit CU1 may comprise an actuator 415 to move the cutting edge EDG1.

FIG. 5 shows, by way of example a laminated sleeve SLEEVE1 formed on the mandrel coil 200, and cutting an article 100 from the laminated sleeve SLEEVE1.

The mandrel belt B0 may comprise one or more ridges and/or grooves F1 to define the axial position of the mandrel belt B0 with respect to the rollers $220a_1$, $220b_1$. The supporting elements $220a_1$, $220b_1$ may comprise positioning features F2, e.g. grooves or ridges for defining the axial position of the belt B0. The axial distance between the positioning features F2 may define the pitch $p_{AB}$ of the mandrel coil 200. The mandrel belt B0 may comprise positioning features F1, which match with the positioning features F2 of the features F2. The mandrel belt B0 may comprise e.g. one or more V-shaped ridge portions and/or one or more V-shaped groove portions to define the transverse position of the mandrel belt B0 with respect to the supporting rollers $220a_1$, $220b_1$.

The supporting rollers $220a_1$, $220b_1$, . . . may also be arranged to contact the edge of the belt B0 such that the edge(s) of the belt B0 may operate as the positioning feature F1.

The apparatus 500 may comprise one or more cutting units CU1 for cutting an article 100 from the sleeve SLEEVE1. The cutting unit may comprise e.g. one or more cutting edges EDG1, EDG2. The cutting unit may comprise two or more cutting edges so that the article 100 may be completely separated from the sleeve during a time period, which is shorter than the time period ΔT needed for one complete rotation of the sleeve. The cutting unit may comprise e.g. one or more circular cutting disks. The cutting unit may comprise e.g. one or more cutting blades. The cutting unit may comprise e.g. one or more cutting blades, one or more cutting disks, one or more cutting water jets, or one or more laser cutting heads. The cutting unit CU1 may comprise an actuator 415 for moving a cutting edge EDG1. The actuator 415 may be e.g. a pneumatic or electromechanical actuator. The actuator 415 may move the cutting edge EDG1 e.g. in a radial direction so as to start and/or stop cutting. The cutting edge EDG1 may temporarily have a radial velocity component $V_R$.

The supporting surface CMB0 has an axial velocity component $v_{0,y}$. The edge of the laminated sleeve SLEEVE1 is displaced by the distance $p_{AB}$ by each complete rotation (360°) of the sleeve SLEEVE1. The sleeve may rotate continuously during cutting of the sleeve, so as to maximize the rate of production of the articles 100. Continuous rotation may allow forming spatially uniform adhesive bond.

The rotation of the sleeve may also be temporarily stopped e.g. in order to cut along the cutting line CUT1, CUT2. However, repetitive acceleration and stopping of the rotation may also cause periodic variation of quality of the adhesive bond between the strips of the sleeve.

The rotation of the sleeve may be temporarily stopped e.g. so as to provide a suitable time period for forming an adhesive bond between the strips of the sleeve.

The cutting unit CE1 may be arranged to follow the axial movement of the sleeve SLEEVE1. The cutting unit CE1 may be arranged to cut the sleeve during rotation of the sleeve SLEEVE1. The method may comprise moving a cutting unit CE1 in the axial direction SY with respect to the mandrel coil 200, and cutting an article 100 by using the cutting unit CU1. The method may comprise moving a cutting point CPOS of the cutting unit CU1 at an axial velocity $v_{0,y}$ during the cutting such that the axial velocity of the cutting point CPOS is substantially equal to the axial velocity $v_{0,y}$ of the laminated sleeve SLEEVE1. Consequently, the cutting line CUT1, CUT2 may be substantially perpendicular to the axis REF0 also when the sleeve SLEEVE1 moves in the axial direction during the cutting.

The apparatus 500 may optionally comprise a sensor SEN1 for detecting the axial position of an edge of the sleeve SLEEVE1. The apparatus 500 may optionally comprise a sensor SEN2 for detecting the axial position of an outer seam J2 of the sleeve SLEEVE1. Information obtained from the sensor SEN1 and/or SEN2 may be used e.g. for controlling operation of the cutting unit CU1.

The method may comprise:
feeding a mandrel belt B0 to an input end IN0 of a mandrel coil 200 so as to provide a moving supporting portion CMB0, which comprises a first moving portion B0A of the mandrel belt B0 and a second adjacent moving portion B0B of the mandrel belt B0,
feeding a bottom strip S1 onto the moving supporting portion CMB0 such that a bottom seam J1 is formed between a first portion $S1_A$ of the bottom strip S1 and an adjacent second portion $S1_B$ of the bottom strip S1,
forming a laminated sleeve SLEEVE1 by feeding a second strip S2 on the bottom strip S1 such that the second strip S2 overlaps the bottom seam J1, such that the second strip S2 adheres to the bottom strip S1, and such that the a second seam J2 is formed between a first portion $S2_A$ of the second strip S2 and a second portion $S2_B$ of the second strip S2,
unwinding the mandrel belt B0 from an output end OUT0 of the mandrel coil 200, and
cutting an endless abrasive article 100 from the laminated sleeve SLEEVE1.

Figure 6:
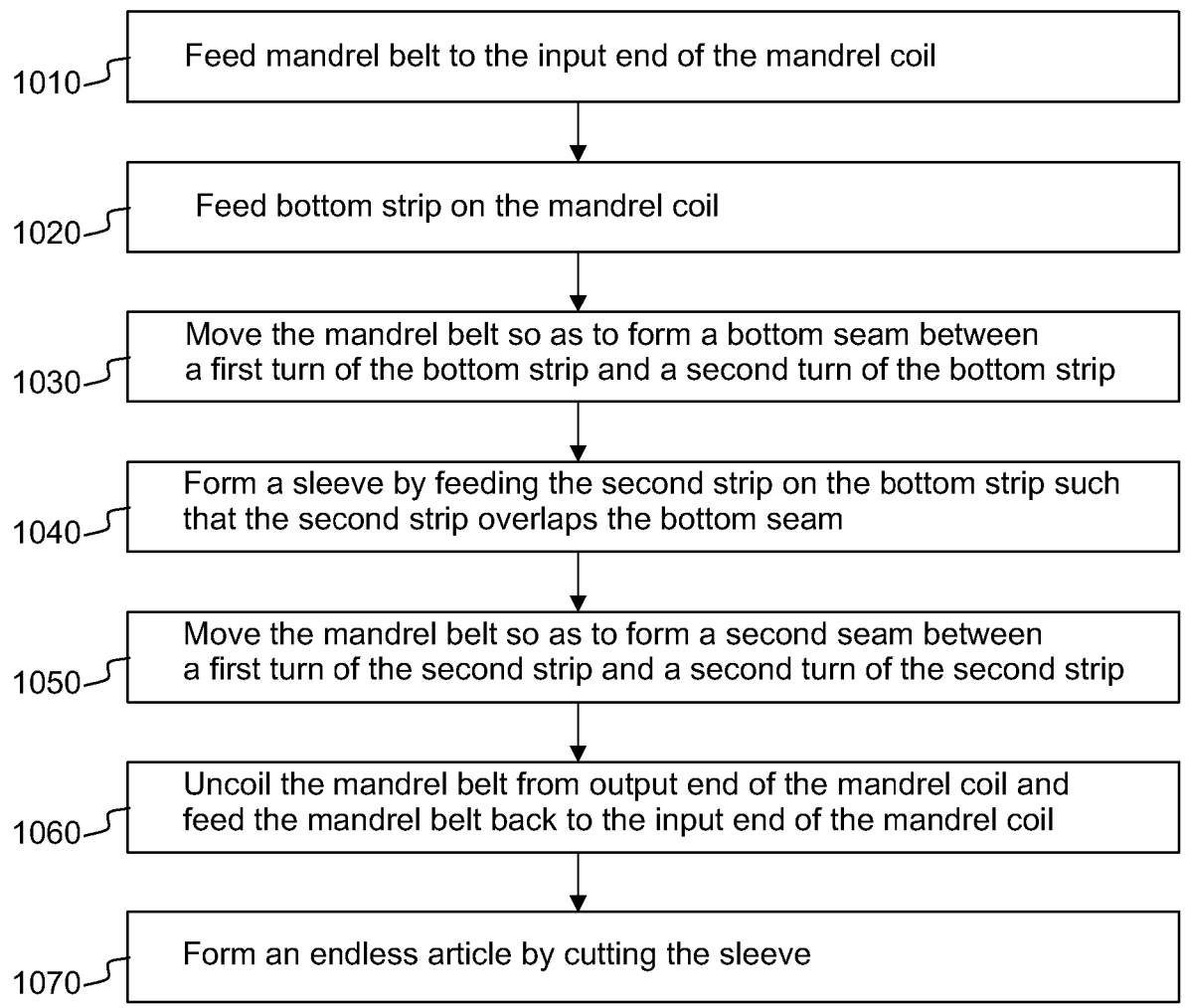
FIG. 6 shows, by way of example, method steps for producing an endless abrasive article.

FIG. 6 shows, by way of example, method steps for producing an endless abrasive article. The method steps 1010 to 1060 may be performed substantially simultaneously.

The method may comprise:
feeding the mandrel belt B0 to input end IN0 of the coil 200 (Step 1010),
feeding the first strip S1 onto the coil 200 (Step 1020),
moving the mandrel belt B0 so as to form a bottom seam J1 between a first turn $S1_A$ of the strip S1 and a second turn $S1_B$ of the strip S1 (step 1030),
forming the sleeve SLEEVE1 by feeding the second strip S2 such that the second strip S2 overlaps the bottom seam J1 (step 1040).
moving the mandrel belt B0 so as to form a second seam J2 between a first turn $S2_A$ of the second strip S2 and a second turn $S2_B$ of the second strip S2 (step 1050),
uncoiling the mandrel belt B0 from the output end OUT2 of the coil 200, and feeding the mandrel belt B0 back to the input end IN0 of the coil 200 (step 1060).

The method may comprise forming an endless article 100 by cutting the sleeve SLEEVE1 (step 1070).

The sleeve may also be formed from only one strip S1, by laminating a first edge of the strip S1 over a second edge of said strip S1. In that case, a joint J1 may be formed such that the first edge of the strip S1 overlaps the second edge of said strip S1. The step 1040 may also be omitted.

The sleeve may also be formed from three or more strips S1, S2, S3.

Figure 7:
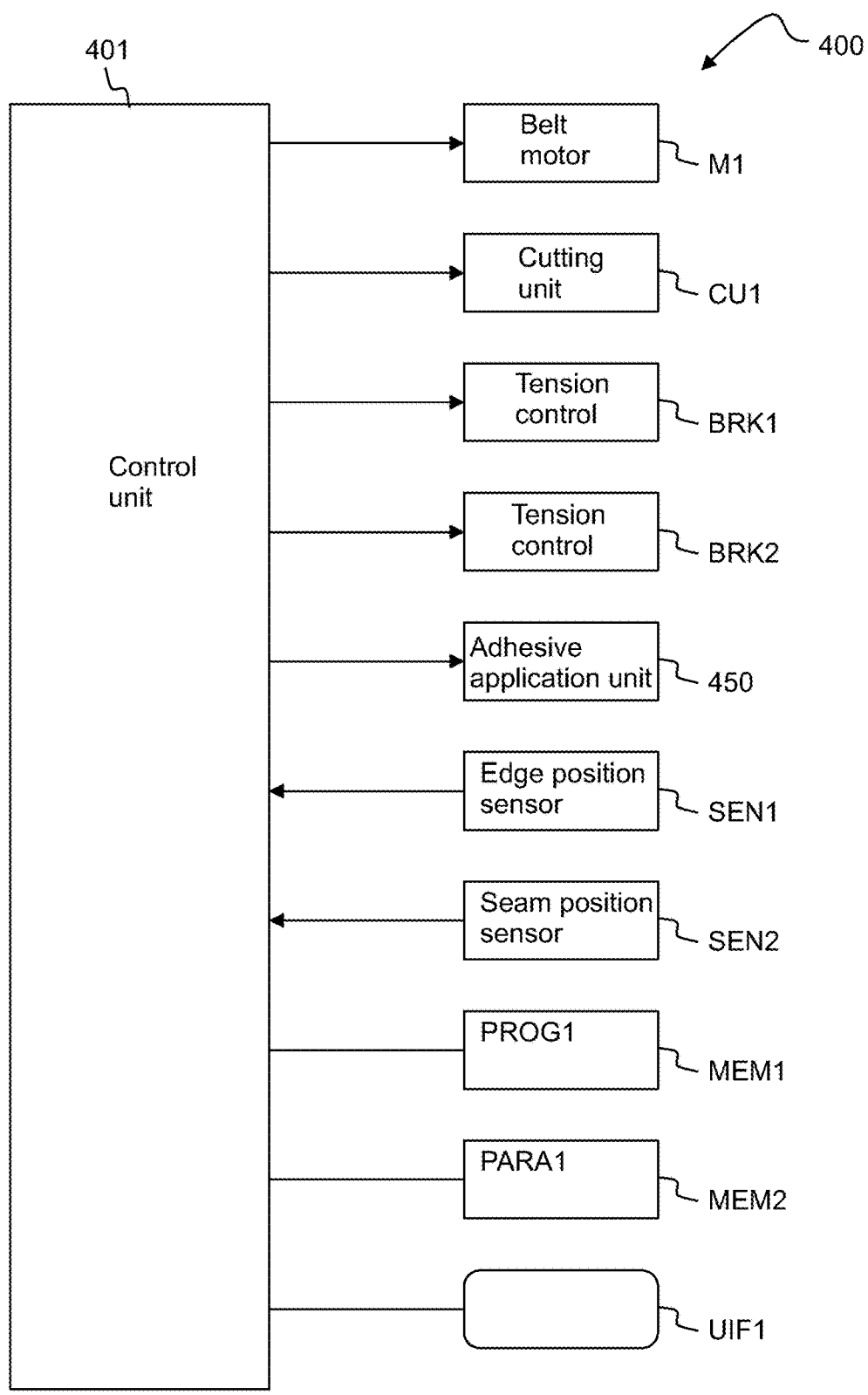
FIG. 7 shows, by way of example, functional units of an apparatus, which is arranged to produce endless abrasive articles.

FIG. 7 shows, by way of example, a control system 400 of the apparatus 500. The apparatus 500 may comprise the control system. The apparatus 500 may comprise the control system. The apparatus 500 may comprise one or more units of the control system. The control system may comprise a control unit 401. The control unit 401 may comprise one or more data processors. The control unit 401 may be e.g. a computer. The control unit 401 may be arranged to control operation of the apparatus 500 e.g. by executing program code PROG1 stored in a memory MEM1. The control unit 401 may be arranged to control operation of the apparatus 500 according to operating parameters PARA1 stored in a memory MEM2. The operating parameters PARA1 may define e.g. the velocity $v_0$ of the belt and/or the width $w_{100}$ of the article 100. The control system 400 may comprise a user interface UIF1 for receiving input from a user and/or for displaying information for the user. The user interface UIF1 may comprise e.g. one or more indicator lamps, a touch screen, a display and/or a keypad. A user may select e.g. the width $w_{100}$ by using the user interface UIF1. The control system 400 may control operation of the motor M1, so as to control movement of the belt B0. The control system 400 may control operation of the cutting unit CU1. The control system 400 may control tension of the strips S1, S2 by controlling operation of brakes BRK1, BRK2. The control system 400 may control operation of an adhesive application unit 450. The control system 400 may receive position information from one or more sensors SEN1, SEN2.

Figure 8:
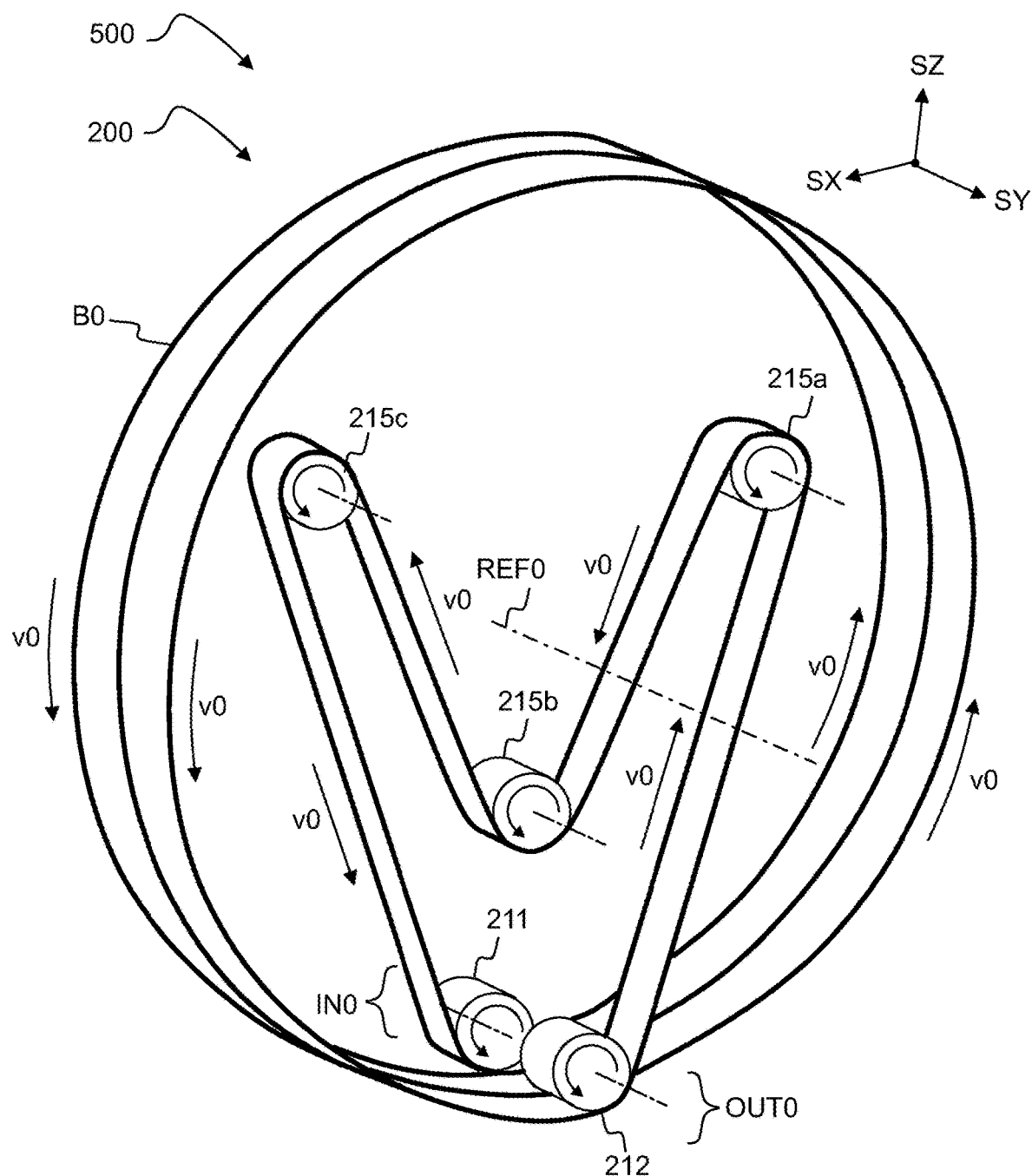
FIG. 8 shows, by way of example, in a three dimensional view, a belt geometry for the mandrel coil.

Referring to FIG. 8, the apparatus 500 may comprise one or more rollers 215a, 215b, 215c for guiding the belt B0 from the output end OUT0 to the input end IN0 of the coil 200. The rollers 215a, 215b, 215c may guide a feedback portion $B0_R$ of the belt B0 from the output OUT0 to the input IN0. The rollers 215a, 215b, 215c may be arranged to e.g. minimize twisting (i.e. torsion) of the belt B0.

Referring to FIG. 9, the coil 200 may be formed of one or more belts $B0_1$, $B0_2$. The belts $B0_1$, $B0_2$ may be arranged to operate in parallel. Using multiple belts instead of a single wide belt may e.g. reduce forces needed to twist the belts and/or may increase operating life of the belts. The belts $B0_1$, $B0_2$ may be made of e.g. reinforced elastomer. The belts $B0_1$, $B0_2$ may be V-belts or micro V belts. The belts $B0_1$, $B0_2$ may be made of e.g. spring steel. Using multiple belts may also allow more freedom to select the pitch $p_{AB}$ of the coil 200, as the number of the belts may be changed and/or as the axial positions of the belts on the supporting rollers $220a_1$, $220a_2$, ... may be changed. The method may comprise changing the pitch $p_{AB}$ by changing the axial position of a belt B0 with respect to a supporting element. When using several belts $B0_1$, $B0_2$ running in parallel, the effective width $w_{CMB0}$ of the supporting surface CMB0 may be e.g. greater than equal to four times the width $w_1$ of a first mandrel belt $B0_1$.

The belt $B0_1$ may have a width $w_1$. The belt $B0_2$ may have a width $w_2$. The coil 200 may comprise a first turn $B0_{1,A}$ and a second turn $B0_{1,B}$ formed from the belt $B0_1$. The coil 200 may comprise a first turn $B0_{2,A}$ and a second turn $B0_{2,B}$ formed from the belt $B0_2$. The turns $B0_{1,B}$, $B0_{2,A}$ may have a common temporary seam $CJ0_{AB}$. The turns $B0_{1,A}$, $B0_{2,A}$ may have a common seam $CJ0_{AA}$. The turns $B0_{1,B}$, $B0_{2,B}$ may have a common seam $CJ0_{BB}$. The width of the seams may be e.g. in the range of 0 to 5 mm. The seams may be gaps.

The first belt $B0_1$ may have a feedback portion $B0_{1,R}$. The second belt $B0_2$ may have a feedback portion $B0_{2,R}$.

FIG. 10a shows, by way of example, a coil 200, which comprises one and a half turns. The apparatus 500 may optionally comprise one or more rollers 215 for controlling tension of the belt B0. The driving motor M1 may be coupled e.g. to the roller 212, 212, and/or 215, in order to move the belt B0 at the velocity $v_0$.

FIG. 10b shows, by way of example, a coil 200, which comprises one complete turn. The apparatus 500 may be arranged to operate such that the position of the contact line LIN2 may substantially coincide with a press roller 460 and with the input and output rollers 211, 212.

Figure 10C:
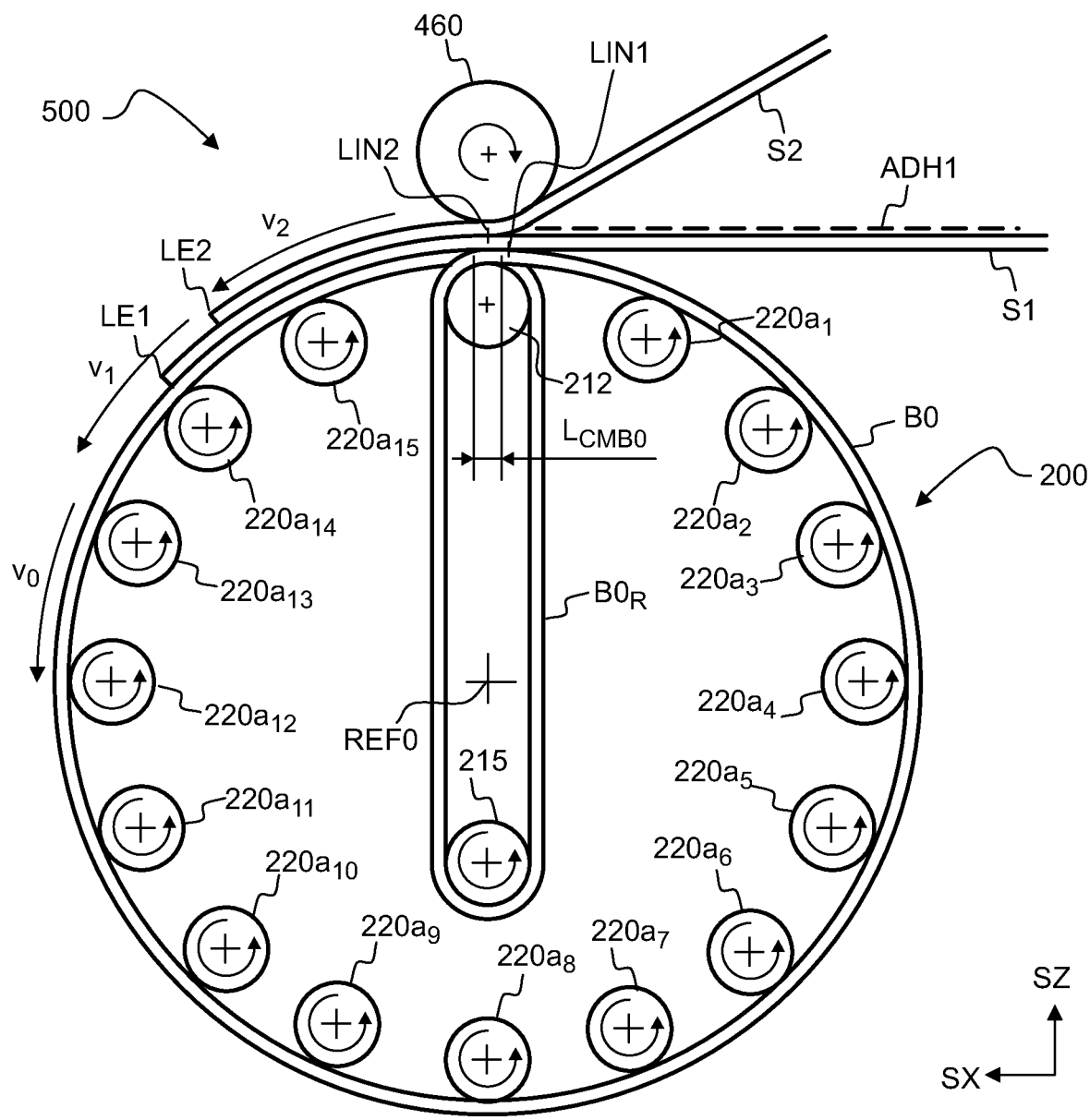
FIG. 10c shows, by way of example, in a side view, feeding of strips onto the mandrel coil.

FIG. 10c shows, by way of example, a coil 200 which is supported by a plurality of supporting elements $220a_1$, $220a_2$, ... $220a_{15}$.

The length $L_{CMB0}$ of the broad portion of the supporting area CMB0 may be e.g. in the range of 1% to 100% of the circumferential length $L_{CIR0}$ of the coil 200.

Figure 11A:
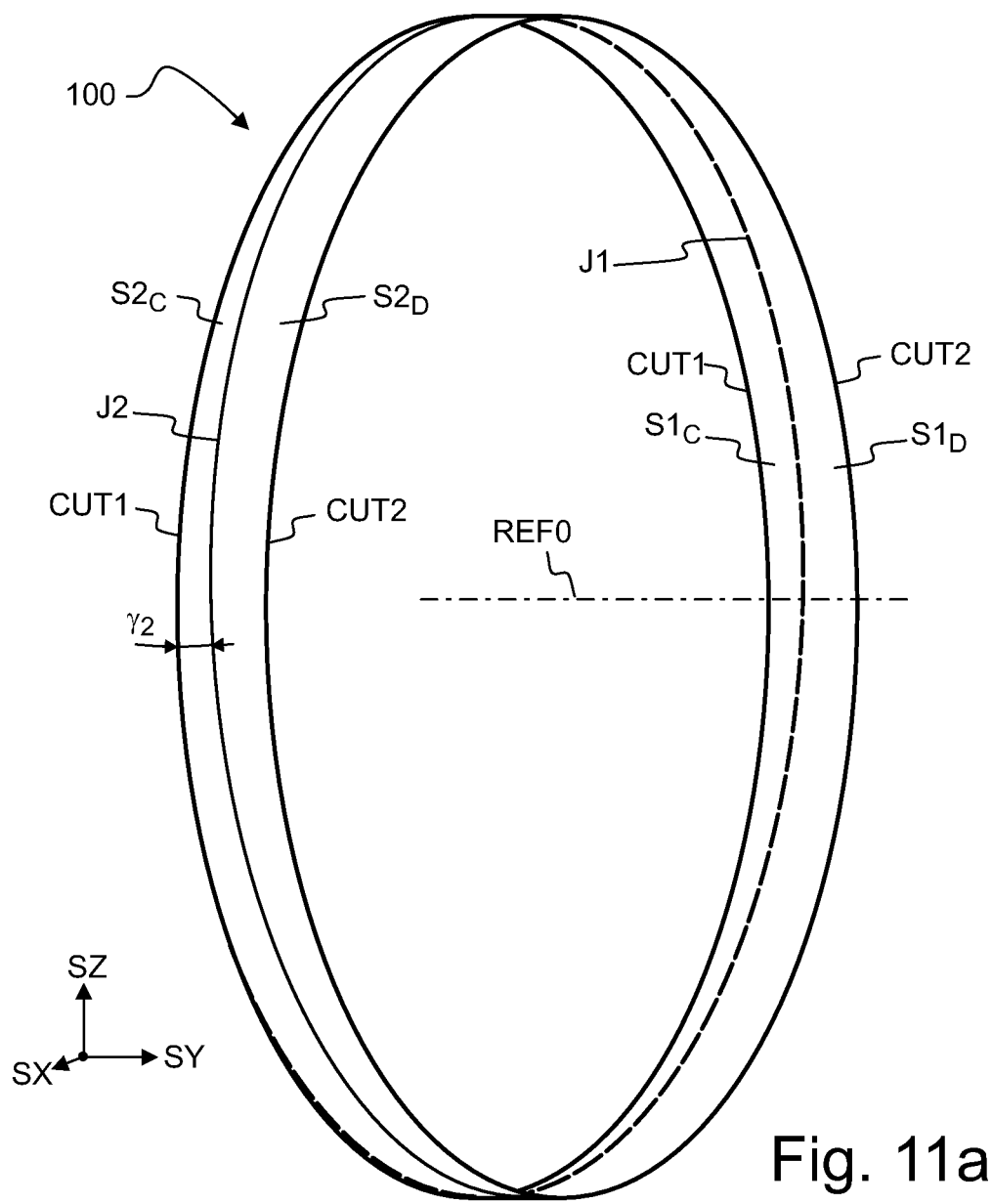
FIG. 11a shows, by way of example, in a three dimensional view, an endless abrasive article formed by cutting the sleeve.
Figure 11B:
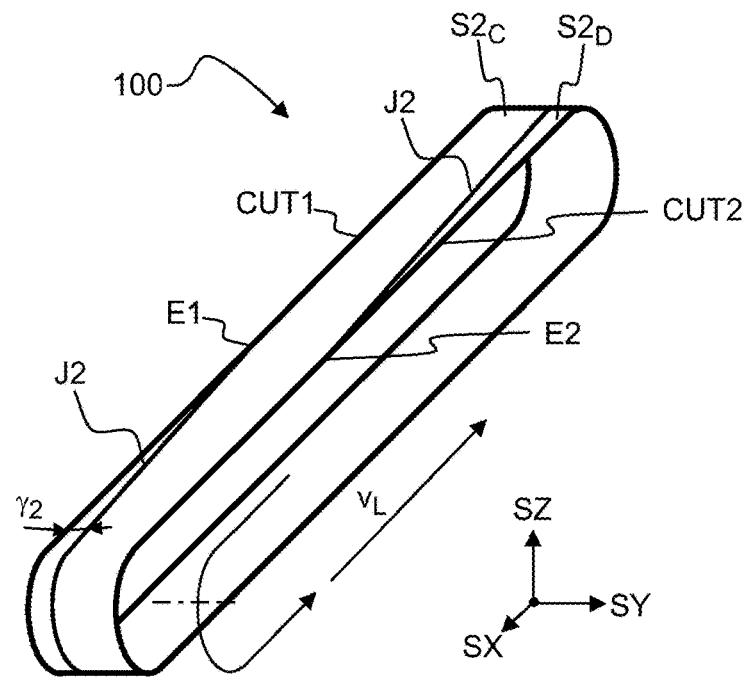
FIG. 11b shows, by way of example, in a three dimensional view, an endless abrasive article formed by cutting the sleeve.
Figure 11C:
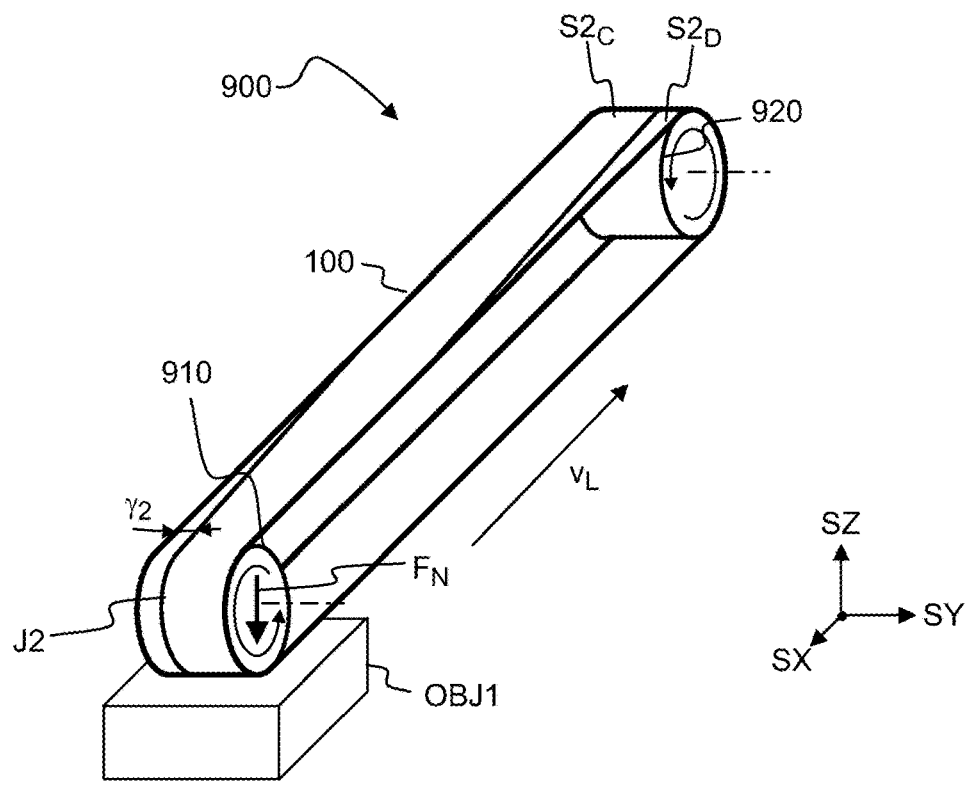
FIG. 11c shows, by way of example, in a three dimensional view, grinding an object by using the abrasive article.

Referring to FIG. 11a, an abrasive article 100 may be separated from the laminated sleeve SLEEVE1 by cutting along the line CUT1 and/or along the line CUT2. The first cutting line CUT1 may define a first edge of the article 100, and the second cutting line CUT2 may define a second edge of the article 100. The cutting lines CUT1, CUT2 may be substantially perpendicular to the axis REF0 of the sleeve SLEEVE1. The article 100 may have substantially constant inner circumference. For example, the article 100 may be produced such that the inner surface of the article 100 is not conical or barrel-shaped. The cutting lines CUT1, CUT2 may be substantially perpendicular to the axis of a cylindrical reference surface, which matches with the inner surface of the abrasive article 100.

The article 100 may comprise a first portion $S1_C$ of the strip S1 and a second portion $S1_D$ of the strip S1. The portions $S1_C$ and $S1_D$ may have a common seam J1.

The article 100 may comprise a first portion $S2_C$ of the strip S2 and a second portion $S2_D$ of the strip S2. The portions $S2_C$ and $S2_D$ may have a common seam J2. The strip S2 may have been laminated on the strip S1. The strip S2 may be attached to the strip S1 such that the strip S2 may overlap the seam J1 and/or the strip S1 may overlap the seam J2. The strip S1 may be attached to the portions $S2_C$, $S2_D$ on both sides of the seam J2. The portions $S2_C$, $S2_D$ may be attached to the strip S1 so as to form the seam J2. The width $w_{100}$ of the abrasive article 100 may be e.g. in the range of 0.1 to 50 times the width $w_{S1}$ of the first strip S1.

The width $w_{100}$ of the abrasive article 100 may be e.g. in the range of 0.1 to 50 times the width $w_{S2}$ of the second strip S2.

Using the coil 200 may provide substantial freedom to select the width of the article 100. The width $w_{100}$ of the abrasive article 100 may be e.g. greater than or equal to the width $w_{S1}$ of the first strip S1 and/or greater than or equal to the width $w_{S2}$ of the second strip S2. The method may allow producing broad endless abrasive belts. The width $w_{100}$ of the abrasive article 100 may be e.g. greater than or equal to 30% of the circumferential length $L_{CIR0}$ of said abrasive article 100. The abrasive article 100 may also be narrower than the first strip S1 and/or the second strip S2.

In an embodiment, the article 100 may comprise a strip S1, which has been laminated on itself (FIG. 12d). In that case the article 100 does not need to comprise the second strip S2.

In an embodiment, the article 100 may comprise three or more strips S1, S2, S3 (FIG. 12c).

The article 100 may be subsequently mounted e.g. on a belt sander, grinder, polisher, and/or rotating machine. The article 100 may be used as an abrasive element of the belt sander, grinder, polisher, or rotating machine. The article 100 may be mounted e.g. on a stationary belt sander, hand held belt sander, and/or robot-controlled belt sander.

Referring to FIG. 11b-11e, the article 100 may be an abrasive belt. The article 100 may be a flexible endless belt, tube and/or sleeve. The article 100 may be used for grinding an object OBJ1 (e.g. for sanding or polishing). The surface of the article 100 may be moved at a longitudinal velocity $v_L$ with respect to the object OBJ1. A portion of the moving surface of the article 100 may be pressed against the object OBJ1 with a force $F_N$. The seam J2 may have an orientation angle $\gamma_2$ with respect to the edges CUT1, CUT2 of the endless abrasive article 100. The seam J2 of the outermost layer S2 may have a first end E1 and a second end E2. The article 100 may be mounted e.g. on a belt sander 900.

Figure 11D:
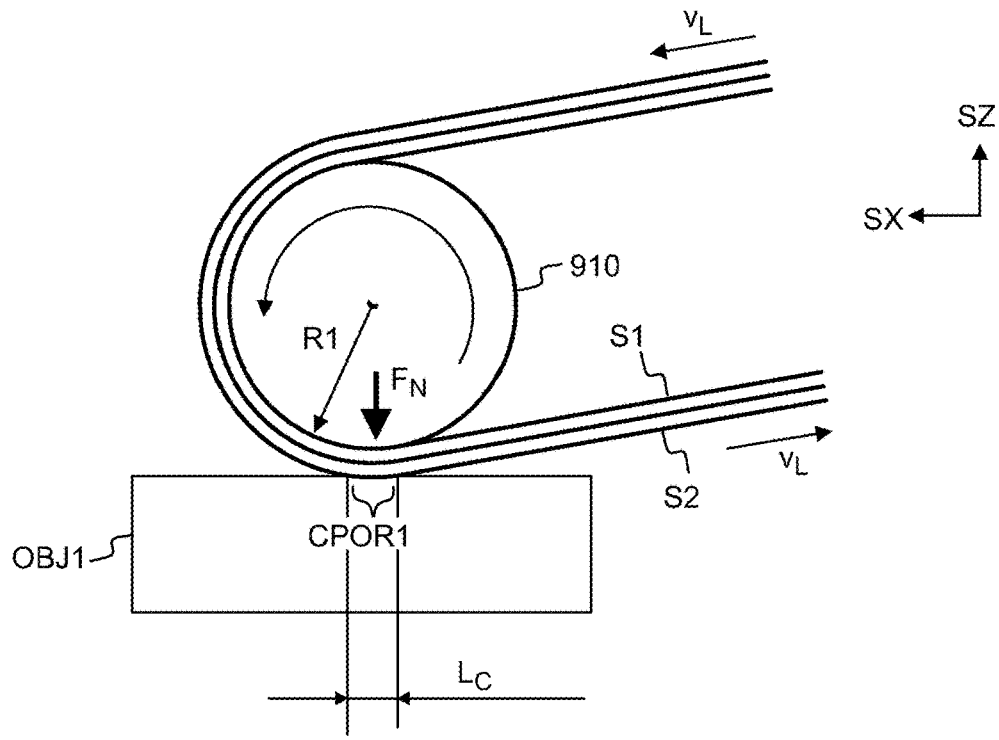
FIG. 11d shows, by way of example, in a side view, grinding an object by using the abrasive article.
Figure 11E:
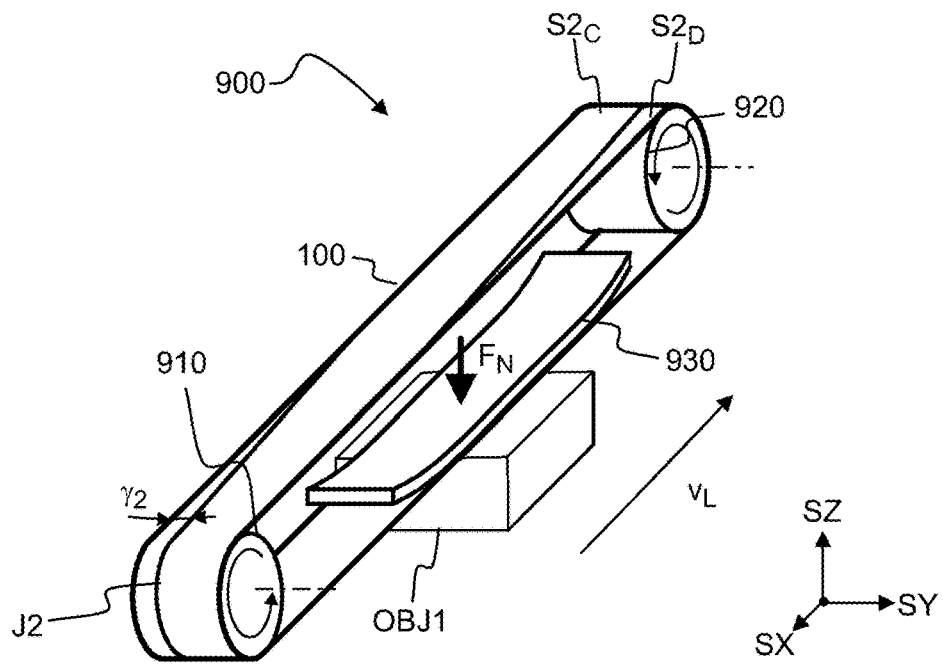
FIG. 11e shows, by way of example, in a three dimensional view, grinding an object by using the abrasive article.

Referring to FIGS. 11d and 11e, the abrasive belt 100 may be used for grinding a surface of an object OBJ1. The abrasive belt 100 may be pressed against the object OBJ1 e.g. by using a roller 910 or by using a support element 930. The moving surface of the abrasive belt 100 may be pressed against the object OBJ1 e.g. by using a roller 910 or by using a support element 930.

The width $w_{J2}$ of the outer seam J2 may be in the range of 0.02 mm to 1.20 mm, preferably in the range of 0.05 to 0.30 mm, so as to provide high surface quality for the object OBJ1. The width $w_{J2}$ of the outer seam J2 may be substantially greater than zero (e.g. greater than 0.05 mm) at each position.

A contact area CPOR1 of the endless article 100 may be temporarily in contact with the object OBJ1. The abrasive belt 100 may have a contact area CPOR1, wherein substantially each point of the outermost strip S2 within the contact area may be simultaneously in contact with a planar surface of the object OBJ1. The contact area CPOR1 may have a length $L_C$. The length $L_C$ may depend e.g. on the radius R1 of the supporting roller 910.

The orientation angle $\gamma 2$ of the outer seam J2 of the abrasive article 100 may be e.g. in the range of 1.0° to 2.5°, in the range of 1.0° to 5.0°, or even in the range of 1.0° to 10.0°. The orientation angle $\gamma 2$ of the outer seam J2 of the abrasive article 100 may be e.g. in the range of 1.0° to 2.5°, in the range of 2.5° to 5.0°, or in the range of 5.0° to 10.0°.

Using a small orientation angle $\gamma 2$ may e.g. reduce the risk of producing visible defects (i.e. marks) on the surface of the object OBJ1 when grinding the object OBJ1 with the article 100. The orientation angle $\gamma 2$ of the outer seam J2 may be in the range of 1° to 2.5° in order to provide high surface quality. The orientation angle $\gamma 2$ of the outer seam J2 may be in the range of 1° to 2.5° in order to provide an increased operating life of the abrasive belt 100. Grinding may produce particles, which are abraded away from the object OBJ1. The presence of the abraded particles between the belt 100 and the object OBJ1 may decrease grinding efficiency and/or may degrade surface quality of the object OBJ1. The orientation angle $\gamma 2$ of the outer seam J2 may be e.g. in the range of 1° to 2.5° so that the outer seam J2 may effectively sweep particles away from the grinding area also in the transverse direction i.e. in the direction SY.

The outer surface of the endless article 100 may move against the object OBJ1 during grinding so that substantially each point of the outermost strip S2 of the article 100 may be periodically brought into contact with the object OBJ1. The outer seam J2 of the article 100 may extend substantially over the whole circumference of the article 100, so as to reduce a risk of causing periodic defects during grinding. The seam J2 may be arranged to be so long that the seam J2 may be locally in contact with the object OBJ1 substantially all the time when the article 100 is pressed against the object OBJ1 during the grinding. The length of a seam J1, J2 of the article 100 may be e.g. greater than or equal to 1.0 times the circumferential length $L_{CIR0}$ of the article 100.

In a first comparative example, the outer seam of a comparative abrasive belt is parallel with the edges of an abrasive belt so that the grinding the surface of an object with the abrasive belt is likely to leave a narrow surface portion, which is not grinded.

In a second comparative example, the outer seam of a comparative abrasive belt has a 45 degree angle with respect to the edges of the abrasive belt so that the longitudinal projection of the seam is short when compared with the circumference of the abrasive belt. Consequently, the seam intermittently hits the surface of an object, and is likely to produce visible defects on the surface of the object.

Referring to FIG. 12a, an endless abrasive article 100 produced by using mandrel coil 200 may comprise one or more layers of supporting material (S1, S2) and one or more layers of abrasive grains G1.

In particular, the article 100 may comprise at least one coated abrasive strip (e.g. S1 or S2). The coated abrasive strip may comprise a flexible backing, wherein a plurality of abrasive grains G1 may be attached to the backing by a binder. The longest dimension of the abrasive grains G1 may be substantially perpendicular to the surface of the strip so as to optimize grinding efficiency.

A size coat may be optionally applied over the abrasive grains G1 so as to improve adhesion of the grains G1 to the backing. One or more of the structural layers S1, S2 may be optionally coated with a sealing layer before applying the adhesive ADH1. The sealing layer may reduce consumption of the adhesive ADH1, may improve strength of the article 100, and/or may improve flexibility of the article 100.

The article 100 may comprise a first material layer formed from the first strip S1 and a second material layer formed from the second strip S2. The first material layer may comprise portions $S1_C$, $S1_D$ of the strip S1. The portions portion $S1_C$, $S1_D$ may have a common seam J1. The second material layer may comprise portions $S2_C$, $S2_D$ of the strip S1. The portions portion $S1_C$, $S1_D$ may have a common seam J2. The strip S2 may overlap the seam J1 and/or the strip S1 may overlap the seam J2. The seam J2 between the edges of the strip S2 may be adhered together by the overlapping strip S1. The transverse distance d12 between the seams J1, J2 may be e.g. in the range of 5% to 50% of the width $w_{100}$. The seam J1 may have a width $w_{J1}$. The seam J2 may have a width $w_{J2}$. The strip S1 may have a thickness $h_{S1}$. The strip S1 may have a thickness $h_{S2}$. The first strip S1 or the second strip S2 may comprise abrasive grains G1 so as to provide an abrasive article 100.

Referring to FIG. 12b, the width $w_{S1}$ of the first strip S1 may also be substantially different from the width of the second strip S2. In particular, the first strip S1 may be substantially narrower the second strip S2 so as to reduce consumption of material. The thickness $h_{S1}$ of the first strip S1 may be substantially different from the thickness $h_{S2}$ of the second strip S2. In particular, the first strip S1 may be substantially thinner than the second strip S2 so as to reduce consumption of material.

The strip (S1) of bottom layer and/or a strip of a middle layer may be e.g. a narrow and/or thin strip, which has a high tensile strength and/or a high Young's modulus, so as to provide stable inner circumferential length. The material of the strip may be selected such that the tensile strength of the strip is higher than a predetermined limit in the longitudinal direction. The material of the strip may be selected such that the Young's modulus of the strip is higher than a predetermined limit in the longitudinal direction.

Referring to FIG. 12c, an endless abrasive article 100 produced by using mandrel coil 200 may also comprise three or more strips S1, S2, S3. The outermost strip (e.g. S3) may comprise abrasive grains G1. A first portion $S3_C$ of the third strip S3 and a second portion $S3_D$ of the third strip S3 may have a common seam J3. The common seam J3 may have a width $w_{J3}$. The seam J3 may have an orientation angle $\gamma_3$ with respect to the edge CUT1, CUT2.

The strip S3 may be bonded to the strip S2 e.g. by the first adhesive ADH1 or by a second different ADH2. The composition of the adhesive ADH2 may also be different from the composition of the adhesive ADH1, so as to optimize one or more properties of the article 100.

The spiral wound endless abrasive article 100 may comprise three overlapping strips S1, S2, S3, which may form e.g. an innermost layer, a middle layer, and an outermost layer.

The article 100 may be optionally turned inside out so that the inner surface becomes the outer surface, and vice versa. The method may comprise turning the article 100 inside out such that a bottom strip (e.g. S1) faces outwards.

The article 100 may also comprise three or more strips S1, S2, S3 such that the innermost strip (e.g. S1) comprises abrasive grains G1. The article 100 may also be turned inside out so as to convert the innermost strip (e.g. S1 or S3) into an outermost strip.

Referring to FIG. 12d, an endless abrasive article 100 produced by using mandrel coil 200 may comprise a single strip S1, which may partly overlap itself. A first portion $S1_C$ of the strip may overlap a second portion of the strip $S1_D$. The overlapping edges of the strip S1 may be optionally beveled or feathered so as to provide substantially constant thickness at different transverse positions of the belt. The article may comprise abrasive grains G1 so as to provide an abrasive article.

The strip S1 of the abrasive article 100 may form a first material layer such that the strip S1 overlaps itself (i.e. a second portion of said strip S1), but wherein the strip S1 does not overlap any other strip.

Figure 12E:
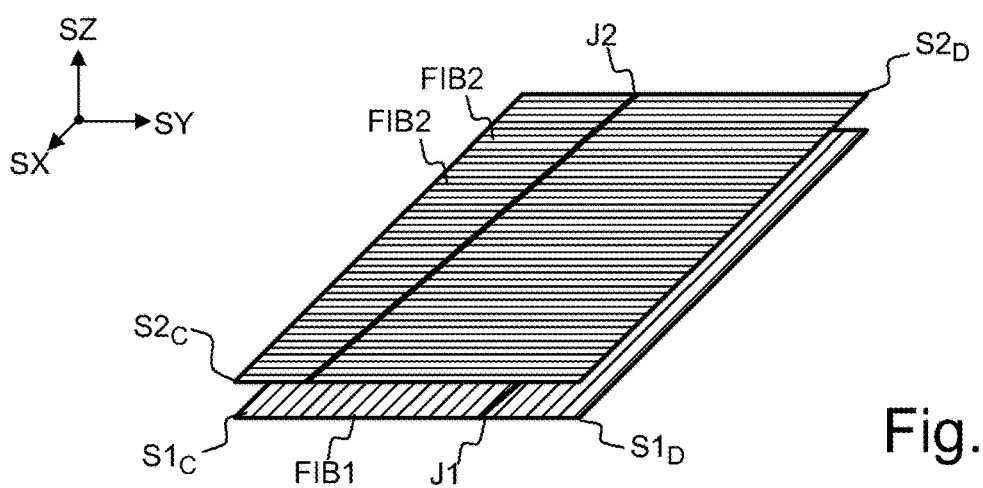
FIG. 12e shows, by way of example, in a three dimensional view, structural layers of an endless article.

Referring to FIG. 12e, the strip S1 and/or S2 may comprise structural elements (FIB1, FIB2), which may have an orientation. The structural elements of the first strip S1 may have a first orientation, and the structural elements of the second strip S2 may have a second different orientation. The orientations of the structural elements may be selected e.g. in order to minimize longitudinal strain and/or in order to maximize flexibility of the abrasive belt 100. The article may comprise abrasive grains G1 so as to provide an abrasive article.

Referring to FIG. 13a, the strip S1, S2, and/or S3 may have anisotropic mechanical properties e.g. due to orientation of fibers and/or due to orientation of polymer chains. The strip may comprise e.g. cloth, paper and/or plastic film, which may have anisotropic mechanical properties. The strip may have a first elastic modulus in the longitudinal direction and a second lower elastic modulus in an inclined direction. The strip S1, S2, and/or S3 may have a maximum elastic modulus in the longitudinal direction.

The strip may comprise substantially longitudinal structural elements FIBL. The strip may comprise e.g. a woven cloth, which comprises a plurality of substantially longitudinal yarns FIBL and substantially transverse yarns FIBT. The structural elements FIBL, FIBT may be e.g. fibers, yarns and/or wires. The longitudinal structural elements FIBL may at least partly define the circumferential (inner) length $L_{CIR0}$ of the article 100.

The orientation angle γ2 of the seam J2 may define the orientation of the edge of the strip S2. The orientation of the longitudinal wires and/or fibers of a strip may be e.g. substantially parallel with the orientation of the edge of said strip. The orientation of the seam may, in turn, define the orientation of the longitudinal structural elements FIBL. Thus, the orientation angle γ2 of the seam J2 of the strip may also define the orientation angle $α_{FIBL}$ of the longitudinal elements FIBL of the strip with respect to the cut edge CUT2 of the article 100.

The orientation of the longitudinal elements FIBL may have an effect on the dimensional stability of the article 100. Longitudinal (i.e. circumferential) tension of the article 100 may cause shear stress in the strip S1, S2, and/or S3. The shear stress may cause a slight increase of circumferential length of the article 100 when the longitudinal elements FIBL are not substantially parallel with the edge CUT2 of the article 100. An orientation angle $α_{FIBL}$ may denote the angle between an average orientation of the longitudinal elements FIBL and the edge CUT2 of the article 100. The orientation angle $α_{FIBL}$ of the longitudinal elements FIBL may be e.g. smaller than or equal to 2.5° so as to provide high dimensional stability of the produced article 100. The orientation angle γ2 of the seam J2 may be e.g. in the range of 1.0 to 2.5° so as to provide high dimensional stability of the produced article 100.

$ϕ_{L,T}$ may denote an angle between the direction of the longitudinal structural elements FIBL and the transverse structural elements FIBT. The angle $ϕ_{L,T}$ may be e.g. substantially equal to 90°. The strip may comprise e.g. a cloth where the angle between longitudinal and transverse yarns is substantially equal to 90°.

The article 100 may comprise one or more layers of strips. The article may comprise one layer, which comprises the strip S1 (see e.g. FIG. 12d). The article may comprise a first layer which comprises the strip S1, and a second layer, which comprises the strip S2 (see e.g. FIG. 12a). The article may comprise a first layer which comprises the strip S1, a second layer, which comprises the strip S2, and a third layer which comprises the strip S3 (see e.g. FIG. 12c). The seam angle (e.g. γ2) of at least one of the strips (e.g. S2) may be e.g. in the range of 1.0° to 2.5° so as to improve dimensional stability of the produced article 100.

The endless spiral wound abrasive article 100 may comprise:
 a first strip (S1),
 a second strip (S2) attached to the first strip (S1), and
 abrasive grains (G1),
wherein a first portion ($S1_C$) of the first strip (S1) and a second portion ($S1_D$) of the first strip (S1) define a first seam (J1), a first portion ($S2_C$) of the second strip (S2) and a second portion ($S2_D$) of the second strip (S2) define a second seam (J2), and the angle ($γ_2$) between the second seam (J2) and the edge (CUT1) of the abrasive article (100) is in the range of 1° to 2.5°.

In particular, the endless spiral wound abrasive article 100 may comprise:
 a first strip (S1),
 a second strip (S2) attached to the first strip (S1) with an adhesive (ADH1), and
 abrasive grains (G1),
wherein a first portion ($S1_C$) of the first strip (S1) and a second portion ($S1_D$) of the first strip (S1) define a first seam (J1), a first portion ($S2_C$) of the second strip (S2) and a second portion ($S2_D$) of the second strip (S2) define a second seam (J2), and the angle ($γ_2$) between the second seam (J2) and the edge (CUT1) of the abrasive article (100) is in the range of 1° to 2.5°.

The strip (e.g. S1 and/or S2) may have a maximum elastic modulus in a direction, which is substantially parallel with the seam (J2). The uppermost or lowermost strip may comprise abrasive grains (G1) bonded e.g. to cloth or paper. The strip (e.g. S1 and/or S2) may comprise a plurality of longitudinal elements FIBL such that the orientation of the longitudinal elements is substantially parallel with the orientation of the seam (J2). The width ($w_{J2}$) of the seam (J2) may be e.g. in the range of 0.02 mm to 1.20 mm, preferably in the range of 0.05 to 0.30 mm.

FIG. 13b illustrates geometric deformation of the article 100 when the article is pulled by a tensioning force $F_{PULL,1}$. FIG. 13a shows the article 100 in an initial state where the tensioning force $F_{PULL,1}$ is low. FIG. 13b shows the same article 100 in a stressed state where the tensioning force $F_{PULL,1}$ is higher than in the initial state. For example, a first roller 910 of a sanding machine 900 may exert a tensioning force $F_{PULL,1}$ on the article 100, and a second roller 920 may exert a corresponding (opposite) counter-force $F_{PULL,2}$ on the article 100. The tensioning force $F_{PULL,1}$ may generate longitudinal stress forces $F_L$ in the longitudinal elements FIBL and transverse stress forces $F_T$ in the transverse longitudinal elements FIBT. The symbol $END_{FIBL}$ may denote an end of a single longitudinal element FIBL. Several stressed longitudinal structural elements FIBL may extend to the edge CUT2 of the article 100. A stress force $F_L$ acting on an inclined longitudinal fiber FIBL1 may need to be balanced by shear forces e.g. in a situation where an end of said fiber FIBL is terminated at the edge CUT2 of the article 100. Consequently, the longitudinal stress forces $F_L$ of the structural elements FIBL may cause in-plane shear and warping of the strip. The article 100 may have an initial width $w_{100}$ and an initial length $DIM_{100}$ in an initial state where the tensioning force $F_{PULL,1}$ is low. A high tensioning force $F_{PULL,1}$ may cause deformation of the article 100, when compared with the initial state. The deformed article 100 may have an altered width $w'_{100}$, and/or an altered length $DIM'_{100}$. The altered width $w'_{100}$ of the article 100 may be lower than the initial width $w_{100}$ and/or the altered length $DIM'_{100}$ may be greater than the initial length $DIM_{100}$. The inner circumferential length of the deformed article may be greater than the initial inner circumferential length of the article 100. The angle $ϕ'_{L,T}$ between the longitudinal and transverse elements FIBL, FIBT may be different from the initial angle $ϕ_{L,T}$. An increased inner circumferential length may cause e.g. tracking problems during grinding. The magnitude of the deformation may depend on the orientation angle (e.g. γ2) of the strip (e.g. S2). Keeping the orientation angle e.g. smaller than or equal to 2.5° may facilitate maintaining the initial dimensions of the article 100 also when the article 100 is tensioned by the tensioning force $F_{PULL,1}$ (e.g. during grinding). Keeping the orientation angle e.g. smaller than or equal to 2.5° may improve dimensional stability of the article 100. The angle γ2 may be e.g. in the range of 1.0° to 2.5° so as to improve dimensional stability of the produced article 100. The orientation angle γ2 may be e.g. smaller than or equal to 2.5° in order to reduce or minimize elongation of the article 100 when the article 100 is under longitudinal tension. The small orientation angle γ2 may ensure that the circumferential length of the article 100 may remain substantially constant in a situation where the article 100 is under longitudinal tension, e.g. when mounted on a belt sander. The ratio $w_{S2}/L_{CIR0}$ of the width $w_{S2}$ of the strip S2 to the circumference $L_{CIR0}$ may be e.g. in the range of 0.017 to 0.044, corresponding to the angular range of 1° to 2.5°.

In general, the structural elements of the strips may be e.g. fibers, yarns and/or wires. The structural elements may be e.g. glass fibers or polymer fibers. The structural elements may be e.g. polyaramid fibers. The structural elements may be e.g. metal wires. The strip may comprise e.g. polyester film, which has a first tensile strength in a first direction and a second different tensile strength in a second direction. The strip S1 and/or S2 may comprise e.g. a cloth, which has a first tensile strength in a first direction (e.g. in the direction SX) and a second different tensile strength in a second orthogonal direction (e.g. in the direction SY).

The structural layers of the article 100 may also be arranged to provide a pre-stressed structure. For example, the pulling forces used during the lamination may be selected so as to provide pre-stressed structure. For example, an outer strip S2 may be arranged to have compression stress, and an inner strip S1 may be arranged to have tensile stress (when the article is in the circular form e.g. as shown in FIG. 11a). This arrangement may e.g. allow minimizing the radius of the supporting roller 910 (FIG. 11d). This arrangement may e.g. allow increasing the operating life of the article 100.

The first strip S1, the second strip S2 and/or the strip S3 may be a coated abrasive web. The first strip S1, the second strip S2 and/or the strip S3 may be obtained e.g. by cutting from a (broader) coated abrasive web.

The first strip S1, the second strip S2 and/or the strip S3 may comprise e.g. textile, fabric, cloth, non-woven material, paper, cardboard, felt, metal foil, plastic foil, corona-treated plastic foil, polypropylene foil (PP), polyethylene foil (PE), polyester foil (PET), polyolefin film, perforated plastic foil, perforated metal foil, mesh foam, plastic mesh, substrate containing hooked stems, looped fabric, vulcanized fiber, metal mesh, metal wires, plastic fibers, glass fibers, fibrous reinforced thermoplastic, fibers or yarns of cotton, fibers or yarns of polyester, rayon, silk, nylon or blends thereof, cellulose fibers, synthetic fibers or blends thereof, polyaramid fibers, and/or carbon fibers.

The article 100 may comprise abrasive grains G1 so as to provide an abrasive article. The abrasive grains G1 may comprise e.g. aluminum oxide, silicon carbide, zirconia alumina, flint, garnet, ceramic material, diamond, boron nitride and/or other type of abrasive material.

The abrasive grains G1 may be bonded to the flexible strip S1, S2 or S3 by one or more adhesives. The abrasive grains G1 may be bonded to the flexible strip S1, S2 and/or S3 already before the strip S1, S2 and/or S3 is laminated to form the sleeve. The strip may be a flexible coated abrasive product. The strip S1, S2 and/or S3 may be a flexible abrasive belt. The strip may be obtained by cutting from a flexible abrasive sheet. The strip may comprise a flexible substrate and a plurality of abrasive grains. The strip may have a substantially constant width before it is laminated to the sleeve. The width of the strip may exhibit small variations e.g. due to manufacturing tolerances.

The grains and the substrate may be optionally coated with a size coat layer. The size coat layer may improve adhesion of the grains to the substrate.

The grit size of the abrasive grains may be selected e.g. from a list consisting of the following grit sizes P12, P16, P20, P24, P30, P36, P40, P50, P60, P80, P100, P120, P150, P180, P220, P240, P280, P320, P360, P400, P500, P600, P800, P1000, P1200, P1500, and P2000. The grit sizes are defined e.g. in the following FEPA standards 43-1:2006, 43-2:2006, 42-1:2006, 42-2:2006. FEPA means "Federation of European Producers of Abrasives".

The grains may be distributed e.g. in a substantially uniform manner over an abrasive surface of the strip S1, S2 and/or S3.

The strip S1, S2 and/or S3 may also be engineered abrasives, i.e. the abrasive surface of the strip S1, S2 and/or S3 may comprise repeating composite structures, which in turn comprise abrasive particles dispersed in a cured binder disposed on a backing material. The shapes of the composite structures may be regular or irregular. The shape, spacing, size and composition of the composite structures may be arranged to provide desired abrasive properties.

The method may be suitable for mass production. The method may comprise producing a plurality of substantially similar abrasive articles 100. A group of produced articles may consist of substantially similar abrasive articles 100.

A given layer of the article 100 may comprise one or more strips. A given layer of the sleeve SLEEVE1 may be formed of a single helical strip. A given layer of the sleeve may also comprise two or more strips. For example, a given (single) layer of the sleeve may comprise two interleaved strips, which may together form a double helical structure. For example, one or more strips of a second layer may be subsequently attached to two interleaved strips of a bottom layer. For example, two or more strips of a second layer may be attached to one or more strips of a bottom layer. A single layer of the sleeve may comprise three strips which may together form a triple helical structure. The apparatus 500 may comprise two or more feeding units to simultaneously feed two or more strips to a single layer. A single layer of the sleeve may comprise two or more strips such that the sum of the widths of the two or more strips of the given layer is smaller than or equal to the pitch of the mandrel coil.

The mandrel coil 200 may be a clockwise coil or a counterclockwise coil. The mandrel belt and the sleeve may be arranged to rotate in the clockwise direction or in the counterclockwise direction with respect to the axis REF0, when viewed in the direction SY. The set-up of the apparatus 500 may also correspond to the mirror image of the apparatus shown in FIG. 2b. The produced articles 100 may correspond to the mirror image of the article shown e.g. in FIG. 11b.

The apparatus 500 may optionally comprise e.g. packing unit to form a package, which contains one or more endless abrasive articles 100 produced by the apparatus 500. The packing unit to form a plurality of packages according to the production rate of the apparatus 500. The packing unit may form e.g. a stack or group of several articles 100. The apparatus 500 may optionally comprise a folding unit, which may receive a first article 100 and a second article 100. The folding unit may fold the second article 100 and insert the second article 100 inside the first article 100 so as to form a package which saves space. The packing unit may form a package, which comprises one or more further articles 100 folded inside the first article 100.

In an embodiment, the strips S1, S2, S3 may be attached to each other also without using an adhesive. For example, the strips S1, S2 may be attached to each other by hook and loop bonds.

The seam (i.e. gap) $CJ0_{AB}$ between the adjacent portions of the mandrel coil 200 may be. e.g. smaller than 5 mm so that the adjacent turns of the belt may provide a substantially uniform supporting area.

However, the gap between adjacent turns of the mandrel belt may also be large. The gap may be e.g. greater than 5 mm, greater than 10 mm, or even greater than 20 mm. The sleeve SLEEVE1 may be mainly supported by the belt B0, but also a plurality of supporting rollers $220a_1$, $220a_2$, $220a_3$, . . . may be arranged to define the inner geometry of the sleeve and to partly support the sleeve SLEEVE1. The sleeve SLEEVE1 may be simultaneously in contact with the belt B0 and with the supporting rollers $220a_1$, $220a_2$, $220a_3$, . . . . The axis of rotation of the supporting rollers $220a_1$, $220a_2$, $220a_3$, . . . may be parallel with the axis REF0. The sleeve has an axial velocity component so that the sleeve needs to slide with respect to the rollers $220a_1$, $220a_2$, $220a_3$, . . . when the axis of rotation of the rollers $220a_1$, $220a_2$, $220a_3$, . . . is parallel with the axis REF0. The material of the supporting rollers $220a_1$, $220a_2$, $220a_3$, . . . may be selected such that the sleeve has low coefficient of friction when sliding against the surfaces of the supporting rollers. The coefficient of friction between the sleeve SLEEVE1 and the belt B0 may be substantially higher than the coefficient of friction between the sleeve SLEEVE1 and the rollers $220a_1$, $220a_2$, $220a_3$, . . . . In an embodiment, the supporting rollers $220a_1$, $220a_2$, $220a_3$, . . . may also be slightly tilted with respect to the axis REF0 so that the sleeve does not need to slide with respect to the surfaces of the supporting rollers.

In an embodiment, the endless article 100 may be used for grinding also when said article does not comprise abrasive grains G1. The abrasive grains G1 may be introduced between the article 100 and the object OBJ1 e.g. immediately before the grinding and/or during the grinding.

In an embodiment, the article 100 may also be implemented such that it does not comprise abrasive grains. The article 100 may be a tubular article. The article 100 may be e.g. a bag or a container, which may be produced by cutting the sleeve SLEEVE1, and by closing one or two ends e.g. by sewing. Various aspects are illustrated by the following examples:

Example 1

A method for producing endless abrasive articles (100), the method comprising:
  providing a mandrel coil (200), wherein an endless mandrel belt (B0) forms at least a first complete turn ($B0_A$) of the mandrel coil (200),
  feeding the endless mandrel belt (B0) to an input end (IN0) of the mandrel coil (200) so as to move the surface of the first turn ($B0_A$) of the mandrel coil (200),
  forming a laminated sleeve (SLEEVE1) by feeding a first strip (S1) on the moving surface of the first complete turn ($B0_A$) of the mandrel coil (200),
  unwinding the mandrel belt (B0) from an output end (OUT0) of the mandrel coil (200), and
  forming an endless abrasive article (100) by cutting the laminated sleeve (SLEEVE1).

Example 2

The method of example 1, comprising guiding the mandrel belt (B0) from the output end (OUT1) of the mandrel coil (200) back to the input end (IN0) of the mandrel coil (200) through the first turn ($B0_A$) of the mandrel coil (200).

Example 3

The method of example 1 or 2, wherein the mandrel belt B0 is arranged to pull the first strip S1 to the mandrel coil 200.

Example 4

The method according to any of the examples 1 to 3, wherein the mandrel coil (200) has a pitch ($p_{AB}$), which is defined by an axial displacement of a point (P0) of the surface of the moving mandrel belt B0 when said point (P0) is rotated by 360° around an axis (REF0) of the mandrel coil (200), and wherein the ratio of the pitch ($p_{AB}$) of the mandrel coil (200) to the circumferential length ($L_{CIR0}$) of the mandrel coil (200) is in the range of 0.017 to 0.087, preferably in the range of 0.017 to 0.044.

Example 5

The method according to any of the examples 1 to 4, comprising winding the first strip (S1) on the mandrel coil (200) such that a first common seam (J1) is formed between a first portion ($S1_A$) of the first strip (S1) and a second portion ($S1_B$) of the first strip (S1), and winding a second strip (S2) on the first strip (S1) such that the second strip (S2) overlaps the first common seam (J1).

Example 6

The method of example 5, wherein a second common seam (J2) is formed between a first portion ($S2_A$) of the second strip (S2) and a second portion ($S2_B$) of the second strip (S2), and wherein the method comprises winding a third strip (S2) on the second strip (S2) such that the third strip (S3) overlaps the second common seam (J2).

Example 7

The method according to any of the examples 1 to 6, wherein an innermost strip (S1) or an outermost strip (S2, S3) of the laminated sleeve (SLEEVE1) comprises abrasive grains (G1).

Example 8

The method according to any of the examples 1 to 7, wherein the first strip (S1) does not slip in axial direction (SY) with respect to the surface of the first turn ($B0_A$).

Example 9

The method according to any of the examples 1 to 8, comprising moving a cutting unit (CE1) in an axial direction (SY) with respect to the mandrel coil (200), and cutting the abrasive article (100) from the sleeve (SLEEVE1) by using the cutting unit (CE1).

Example 10

An apparatus (500) for producing endless abrasive articles (100), the apparatus (500) comprising:
  an endless mandrel belt (B0),
  a mandrel coil (200), wherein the endless mandrel belt (B0) forms at least a first complete turn ($B0_A$) of the mandrel coil (200),
  one or more guiding elements (211) to feed the endless mandrel belt (B0) to an input end (IN0) of the mandrel coil (200) so as to move the surface of the first turn ($B0_A$) of the mandrel coil (200),
  a feeding unit (FUNIT1) to feed a first strip (S1) on the moving surface of the first complete turn ($B0_A$) of the mandrel coil (200), so as to form a laminated sleeve (SLEEVE1), one or more guiding elements (212) for unwinding the mandrel belt (B0) from an output end (OUT0) of the mandrel coil (200), and one or more cutting units (CU1) to form an endless abrasive article (100) by cutting the laminated sleeve (SLEEVE1).

Example 11

The apparatus (500) of example 10, comprising a cutting unit (CU1), which is arranged to cut the sleeve (SLEEVE1) at a cutting point (CPOS) such that the cutting point (CPOS) moves in an axial direction (REF0) with respect to the mandrel coil (200).

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

The invention claimed is:

1. A method for producing endless abrasive articles (100), the method comprising:
   providing a mandrel coil (200), which comprises a first complete turn ($B0_A$) formed of an endless mandrel belt (B0),
   feeding the endless mandrel belt (B0) to an input end (IN0) of the mandrel coil (200) and unwinding the endless mandrel belt (B0) from an output end (OUT0) of the mandrel coil (200) so as to move the surface of the first complete turn ($B0_A$) of the mandrel coil (200), wherein the mandrel belt (B0) is guided from the output end (OUT1) of the mandrel coil (200) back to the input end (IN0) of the mandrel coil (200) through the first complete turn ($B0_A$) of the mandrel coil (200),
   forming a laminated sleeve (SLEEVE1) from one or more strips such that an innermost or an outermost strip of the laminated sleeve comprises abrasive grains, wherein a first layer of the laminated sleeve is formed by feeding a first strip (S1) on the moving surface of the first complete turn ($B0_A$) of the mandrel coil (200), and
   forming an endless abrasive article (100) by cutting the laminated sleeve (SLEEVE1).

2. The method of claim 1, wherein the mandrel belt is arranged to pull the first strip (S1) to the mandrel coil (200).

3. The method according to claim 1, wherein the mandrel coil (200) has a pitch ($p_{AB}$), which is defined by an axial displacement of a point (P0) of the surface of the moving mandrel belt (B0) when said point (P0) is rotated by 360° around an axis (REF0) of the mandrel coil (200), and wherein the ratio of the pitch ($p_{AB}$) of the mandrel coil (200) to the circumferential length ($L_{CIR0}$) of the mandrel coil (200) is in the range of 0.017 to 0.087, preferably in the range of 0.017 to 0.044.

4. The method according to claim 1, comprising winding the first strip (S1) on the mandrel coil (200) such that a first common seam (J1) is formed between a first portion ($S1_A$) of the first strip (S1) and a second portion ($S1_B$) of the first strip (S1), and winding a second strip (S2) on the first strip (S1) such that the second strip (S2) overlaps the first common seam (J1).

5. The method of claim 4, wherein a second common seam (J2) is formed between a first portion ($S2_A$) of the second strip (S2) and a second portion ($S2_B$) of the second strip (S2), and wherein the method comprises winding a third strip (S3) on the second strip (S2) such that the third strip (S3) overlaps the second common seam (J2).

6. The method according to claim 1, wherein the first strip (S1) does not slip in axial direction (SY) with respect to the surface of the first complete turn ($B0_A$).

7. The method according to claim 1, comprising moving a cutting unit (CE1) in an axial direction (SY) with respect to the mandrel coil (200), and cutting the abrasive article (100) from the sleeve (SLEEVE1) by using the cutting unit (CE1).

8. A method for producing endless abrasive articles, the method comprising:
   providing a mandrel coil, which comprises a first complete turn formed of an endless mandrel belt,
   feeding the endless mandrel belt to an input end of the mandrel coil, and unwinding the endless mandrel belt from an output end of the mandrel coil, so as to move the surface of the first complete turn of the mandrel coil,
   forming a laminated sleeve from one or more strips such that an innermost or an outermost strip of the laminated sleeve comprises abrasive grains, wherein a first layer of the laminated sleeve is formed by feeding a first strip on the moving surface of the first complete turn of the mandrel coil, wherein the mandrel belt is arranged to pull the first strip to the mandrel coil, and
   forming an endless abrasive article by cutting the laminated sleeve.

9. A method for producing endless abrasive articles, the method comprising:
   providing a mandrel coil, which comprises a first complete turn formed of an endless mandrel belt,
   feeding the endless mandrel belt to an input end of the mandrel coil, and unwinding the endless mandrel belt from an output end of the mandrel coil, so as to move the surface of the first complete turn of the mandrel coil,
   forming a laminated sleeve from one or more strips such that an innermost or an outermost strip of the laminated sleeve comprises abrasive grains, wherein a first layer of the laminated sleeve is formed by feeding a first strip on the moving surface of the first complete turn of the mandrel coil, and
   forming an endless abrasive article by cutting the laminated sleeve,
   wherein the mandrel coil has a pitch, which is defined by an axial displacement of a point of the surface of the moving mandrel belt when said point is rotated by 360° around an axis of the mandrel coil, and wherein the ratio of the pitch of the mandrel coil to the circumferential length of the mandrel coil is in the range of 0.017 to 0.087.

10. A method for producing endless abrasive articles, the method comprising:
    providing a mandrel coil, which comprises a first complete turn formed of an endless mandrel belt,
    feeding the endless mandrel belt to an input end of the mandrel coil, and unwinding the endless mandrel belt from an output end of the mandrel coil, so as to move the surface of the first complete turn of the mandrel coil,
    forming a laminated sleeve from one or more strips such that an innermost or an outermost strip of the laminated sleeve comprises abrasive grains, wherein a first layer of the laminated sleeve is formed by feeding a first strip on the moving surface of the first complete turn of the mandrel coil, winding the first strip on the mandrel coil such that a first common seam is formed between a first portion of the first strip and a second portion of the first strip, winding a second strip on the first strip such that the second strip overlaps the first common seam wherein a second common seam is formed between a first portion of the second strip and a second portion of the second strip, winding a third strip on the second strip such that the third strip overlaps the second common seam, and forming an endless abrasive article by cutting the laminated sleeve.

11. A method for producing endless abrasive articles, the method comprising:

provide a mandrel coil, which comprises a first complete turn formed of an endless mandrel belt, feeding the endless mandrel belt to an input end of the mandrel coil, and unwinding the endless mandrel belt from an output end of the mandrel coil, so as to move the surface of the first complete turn of the mandrel coil, forming a laminated sleeve from one or more strips such that an innermost or an outermost strip of the laminated sleeve comprises abrasive grains, wherein a first layer of the laminated sleeve is formed by feeding a first strip on the moving surface of the first complete turn of the mandrel coil, wherein the first strip does not slip in axial direction with respect to the surface of the first complete turn, and forming an endless abrasive article by cutting the laminated sleeve.

12. A method for producing endless abrasive articles, the method comprising:

providing a mandrel coil, which comprises a first complete turn formed of an endless mandrel belt, feeding the endless mandrel belt to an input end of the mandrel coil, and unwinding the endless mandrel belt from an output end of the mandrel coil, so as to move the surface of the first complete turn of the mandrel coil, forming a laminated sleeve from one or more strips such that an innermost or an outermost strip of the laminated sleeve comprises abrasive grains, wherein a first layer of the laminated sleeve is formed by feeding a first strip on the moving surface of the first complete turn of the mandrel coil, moving a cutting unit in an axial direction with respect to the mandrel coil, and forming an endless abrasive article by cutting the endless abrasive article from the laminated sleeve by using the cutting unit.

* * * * *